United States Patent
Freeman et al.

(10) Patent No.: US 12,134,111 B2
(45) Date of Patent: Nov. 5, 2024

(54) REAL-TIME TRACKING OF PARCELS IN A FACILITY

(71) Applicant: United Parcel Service Of America, Inc., Atlanta, GA (US)

(72) Inventors: Mallory Freeman, Atlanta, GA (US); Timothy Major, Atlanta, GA (US); David Wu, Atlanta, GA (US); Lauren Skorb, Atlanta, GA (US); Matthew Britton, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 18/227,090

(22) Filed: Jul. 27, 2023

(65) Prior Publication Data

US 2023/0364650 A1 Nov. 16, 2023

Related U.S. Application Data

(63) Continuation of application No. 17/078,518, filed on Oct. 23, 2020, now Pat. No. 11,752,522.

(51) Int. Cl.
*B07C 3/18* (2006.01)
*B07C 3/00* (2006.01)
(Continued)

(52) U.S. Cl.
CPC ............ *B07C 3/18* (2013.01); *B07C 3/006* (2013.01); *B07C 3/08* (2013.01); *B07C 3/10* (2013.01);
(Continued)

(58) Field of Classification Search
CPC .. B07C 3/18; B07C 3/006; B07C 3/08; B07C 3/10; B07C 3/00; B07C 7/005; G06Q 10/0836; G06Q 10/08
See application file for complete search history.

(56) References Cited

U.S. PATENT DOCUMENTS 6,633,232 B2 * 10/2003 Trajkovic ............... G06Q 30/06
348/143
7,119,687 B2 * 10/2006 Paulsen .............. G08B 13/2454
342/450
(Continued)

FOREIGN PATENT DOCUMENTS

WO 2014/205273 A2 12/2014

OTHER PUBLICATIONS

International Preliminary Report on Patentability received for PCT Patent Application No. PCT/US2021/054732, mailed on May 4, 2023, 7 pages.
(Continued)

*Primary Examiner* — Patrick H Mackey
(74) *Attorney, Agent, or Firm* — Shook, Hardy & Bacon L.L.P.

(57) ABSTRACT

Read events capturing parcel information as a parcel is transported through a facility is received, and a configuration file mapping readers capturing the read events to workspace locations within the facility is accessed. Utilizing the read events and configuration file, one or more locations are determined for a parcel being transported through a facility. The locations may form a most likely path, or sequence of locations, through the facility. The determined locations may be utilized for generating one or more graphical user interface elements for tracking parcel and/or other operational aspects. For example, a graphical user interface may indicate errors, such as errors in the parcel's path and slowdowns, detected from the read events. Additionally, volume of parcels over time may be determined from the read events. Further, a graphical user interface may indicate employee performance based on errors and/or read events attributed to the employee.

20 Claims, 20 Drawing Sheets

(51) Int. Cl.
*B07C 3/08* (2006.01)
*B07C 3/10* (2006.01)
*G06Q 10/0833* (2023.01)
*G06Q 50/60* (2024.01)

(52) U.S. Cl.
CPC ......... *G06Q 10/0833* (2013.01); *G06Q 50/60* (2024.01)

(56) References Cited

U.S. PATENT DOCUMENTS

| | | | | |
|---|---|---|---|---|
| 7,138,920 | B2* | 11/2006 | Nyfelt | G01S 13/751 340/8.1 |
| 8,665,067 | B2* | 3/2014 | Cristache | G07C 9/28 340/10.2 |
| 9,443,218 | B1* | 9/2016 | Stiefel | G06Q 10/08 |
| 9,514,340 | B2* | 12/2016 | Cristache | G01S 5/0289 |
| 9,934,545 | B2 | 4/2018 | Kropp | |
| 10,121,031 | B2* | 11/2018 | Kantor | G06K 7/10366 |
| 11,321,548 | B2 | 5/2022 | Winkler | |
| 2002/0167408 | A1* | 11/2002 | Trajkovic | G06Q 30/06 340/995.22 |
| 2009/0012882 | A1* | 1/2009 | Sarangapani | G06Q 10/087 705/28 |
| 2009/0012892 | A1* | 1/2009 | Biase | G06Q 40/04 705/37 |
| 2012/0025973 | A1* | 2/2012 | Derks | G01S 5/14 340/539.13 |
| 2015/0220879 | A1 | 8/2015 | Dearing et al. | |
| 2019/0113632 | A1 | 4/2019 | Lucrecio et al. | |
| 2019/0235092 | A1 | 8/2019 | Bastian et al. | |
| 2021/0067914 | A1 | 3/2021 | Butterwegge et al. | |
| 2022/0126326 | A1 | 4/2022 | Freeman et al. | |

OTHER PUBLICATIONS

International Search Report and Written Opinion received for PCT Patent Application No. PCT/US2021/054732, mailed on Jan. 14, 2022, 9 pages.

* cited by examiner

| DVC_LOC | loc_1 | loc_2 | loc_3 |
|---------|-------|-------|-------|
| loc_1   | 0     | 1     | 0     |
| loc_2   | 0     | 0     | 0     |
| loc_3   | 1     | 0     | 0     |

FIG. 4.

REAL-TIME TRACKING OF PARCELS IN A FACILITY

CROSS-REFERENCE TO RELATED APPLICATIONS

This application is a continuation of, and claims priority from, U.S. patent application Ser. No. 17/078,518 filed on Oct. 23, 2020, the contents of which are hereby incorporated herein in their entirety by reference.

BACKGROUND

Sorting facilities are utilized in logistics networks to sort parcels received from different locations into common destinations. As the number of parcel deliveries continues to increase, sorting facilities have consequently grown in physical size and complexity of operations within the facilities. Parcels being sorted may take various routes within a facility based on different factors, including the type and size of parcel, the unloading area in which the parcel arrives, and the loading area to which a parcel must go to reach the next destination in its route. Often, the parcels are transported through a facility on various conveyor apparatuses over periods of time with minimal to no human intervention, and, when parcels are moved or transitioned by an employee, the operation is very quick due to the high volume of parcels being processed. Existing technologies scan parcels as they are being unloaded into a facility and as they are being loaded into a carrier for transportation into the next destination but do not track a parcel as it is moved between these two points within a facility. As such, existing technologies have difficulty accurately tracking the location of parcels as they are being transported through a facility. When an error occurs, such as a misload error, the error is often not detected until well after the error occurs and likely not until the parcel is finished being sorted within the facility.

SUMMARY

Various embodiments of the present disclosure are directed to a computer-implemented method, a system, and an apparatus. In some embodiments, a graphical user interface is generated based on locations of parcels determined from parcel tracking data. A configuration file mapping readers with sensors to particular workspace locations within a facility is accessed, and parcel tracking data in the form of read events is received. The read events identify a parcel, the reader and, in exemplary aspects, time information. Locations of parcels may be determined based on the parcel tracking data and utilizing the configuration file. The locations may form a path, or a sequence of locations. Further, in exemplary embodiments, the parcel tracking data is captured in real time as a parcel is transported through a facility and the locations may be determined from the parcel tracking data in real time.

Utilizing the determined locations, one or more graphical user interface elements may be generate and presented, via a user device, to a user. In one embodiment, a graphical user interface comprising a visual representation of the facility with each workspace location is generated with location indicators for one or more parcels. The location indicators may be positioned to correspond to the locations determined from parcel tracking data. Additionally, path errors may be determined from the parcel tracking data and indicated to a user via a graphical user interface. A path error, which may result from a misload or missort, may occur when the path determined for a parcel does not match the expected path for that parcel. When there is an inconsistency between the determined path and the expected path, an error indicator may be included on a generated graphical user interface to indicate a location, such as the current location, and parcel associated with the error.

In some embodiments, a slowdown error is detected and indicated through the graphical user interface. A slowdown may be detected by comparing a threshold period of time for a subpath between two locations (which may be stored in the configuration file) to the time that it takes a parcel to actually move between the two locations as determined from the time information on read events from the two locations. Further, in some embodiments, the graphical user interface indicates volume(s) of parcels (e.g., total parcel count for a particular workspace location and/or the facility as a whole) based on determined locations.

Further, in some embodiments, the read events are attributed to employee(s) of the facility, and the graphical user interface indicates employee performance based on the attributed read events. Employees may be assigned to a reader, and read events captured by the reader during the assigned time are attributed to the associated employee. The read events may be utilized to determine measures of productivity and/or accuracy, which may be utilized in generating the graphical user interface.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter. In various embodiments, any functionality can be added or removed from the computer-implemented method, the system, and the apparatus described above, such as functionality described with respect to system of FIG. 2 and the flow diagrams of FIGS. 11-13.

BRIEF DESCRIPTION OF THE DRAWINGS

Figure 1:
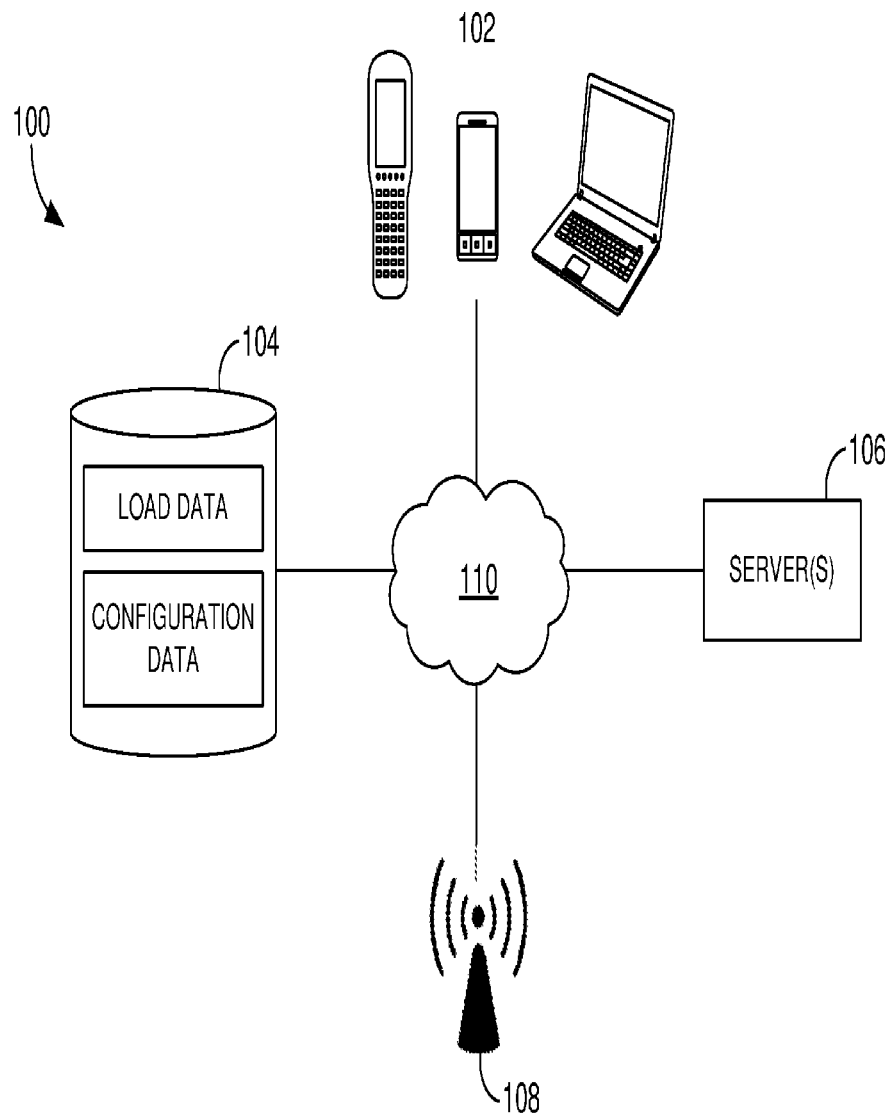
Figure 2:
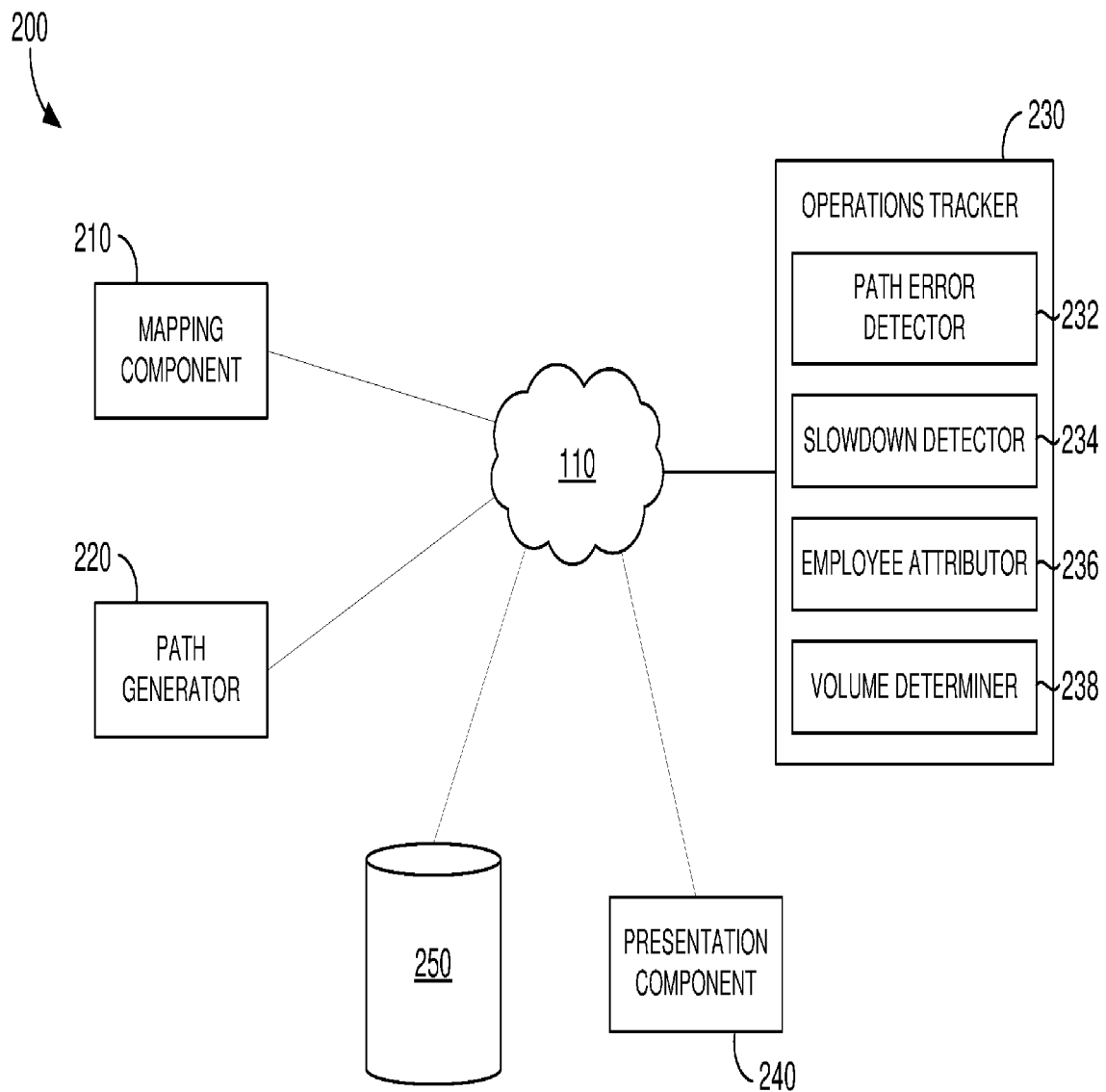
Figure 3:
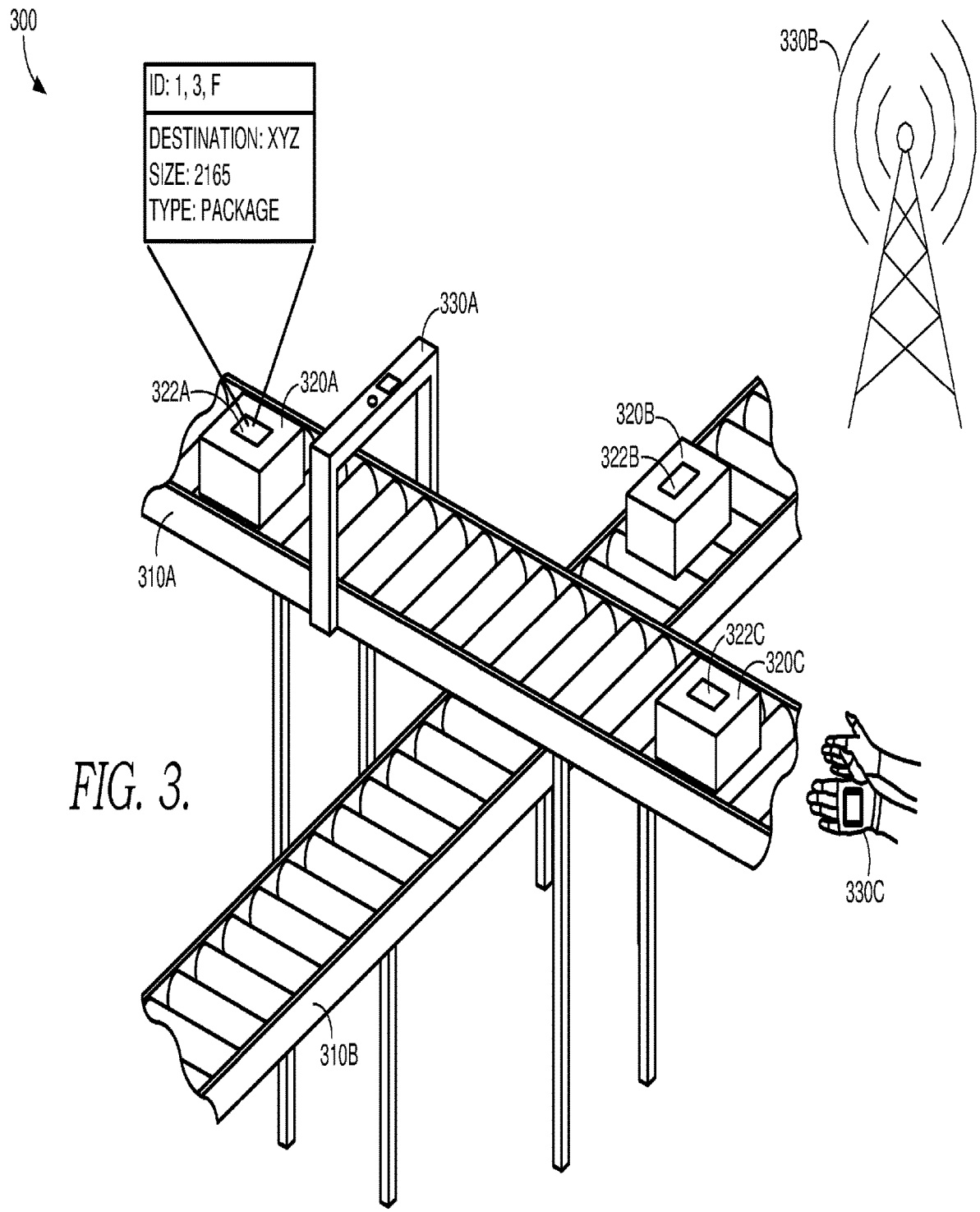
Figure 5:
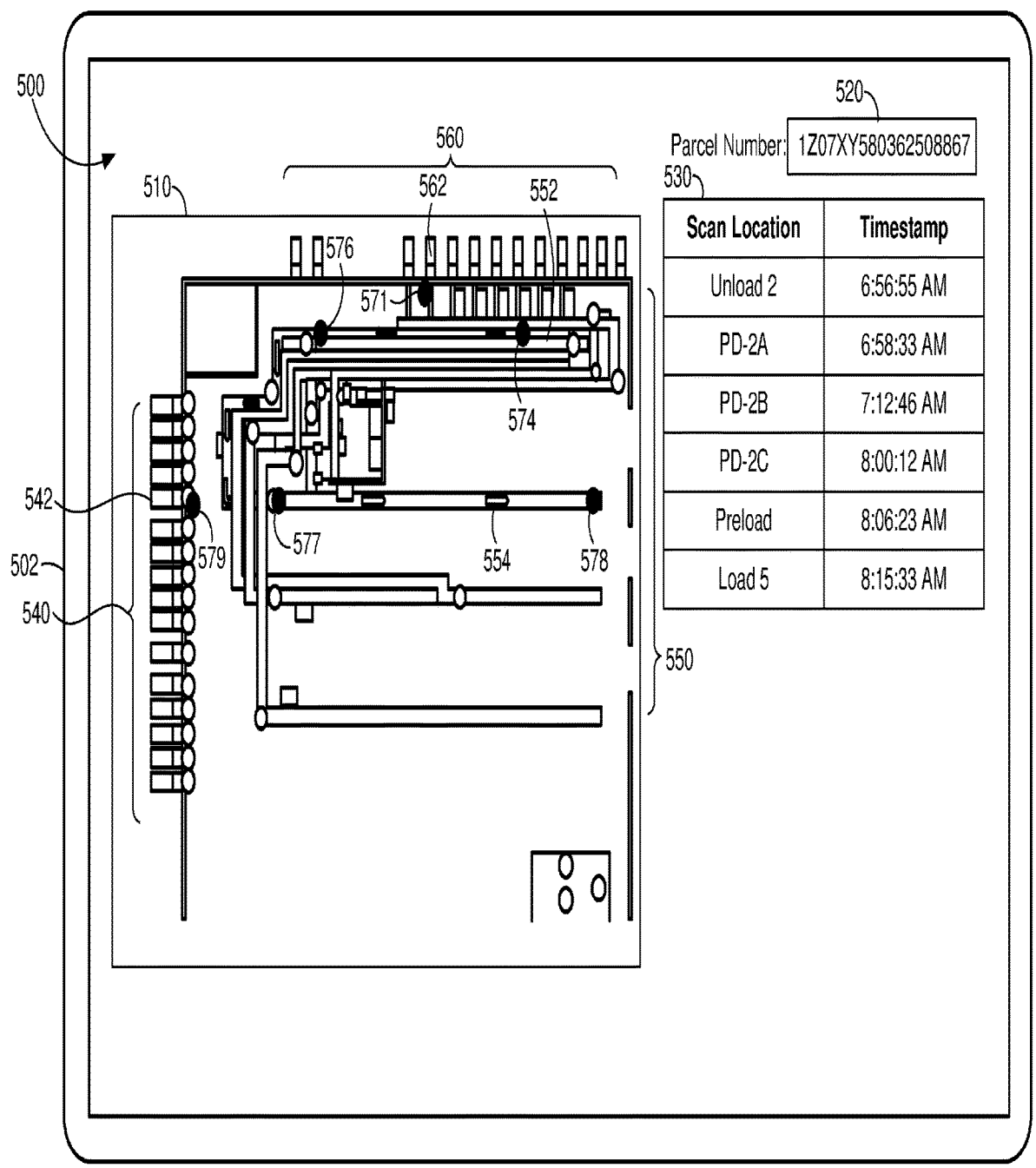
Figure 7:
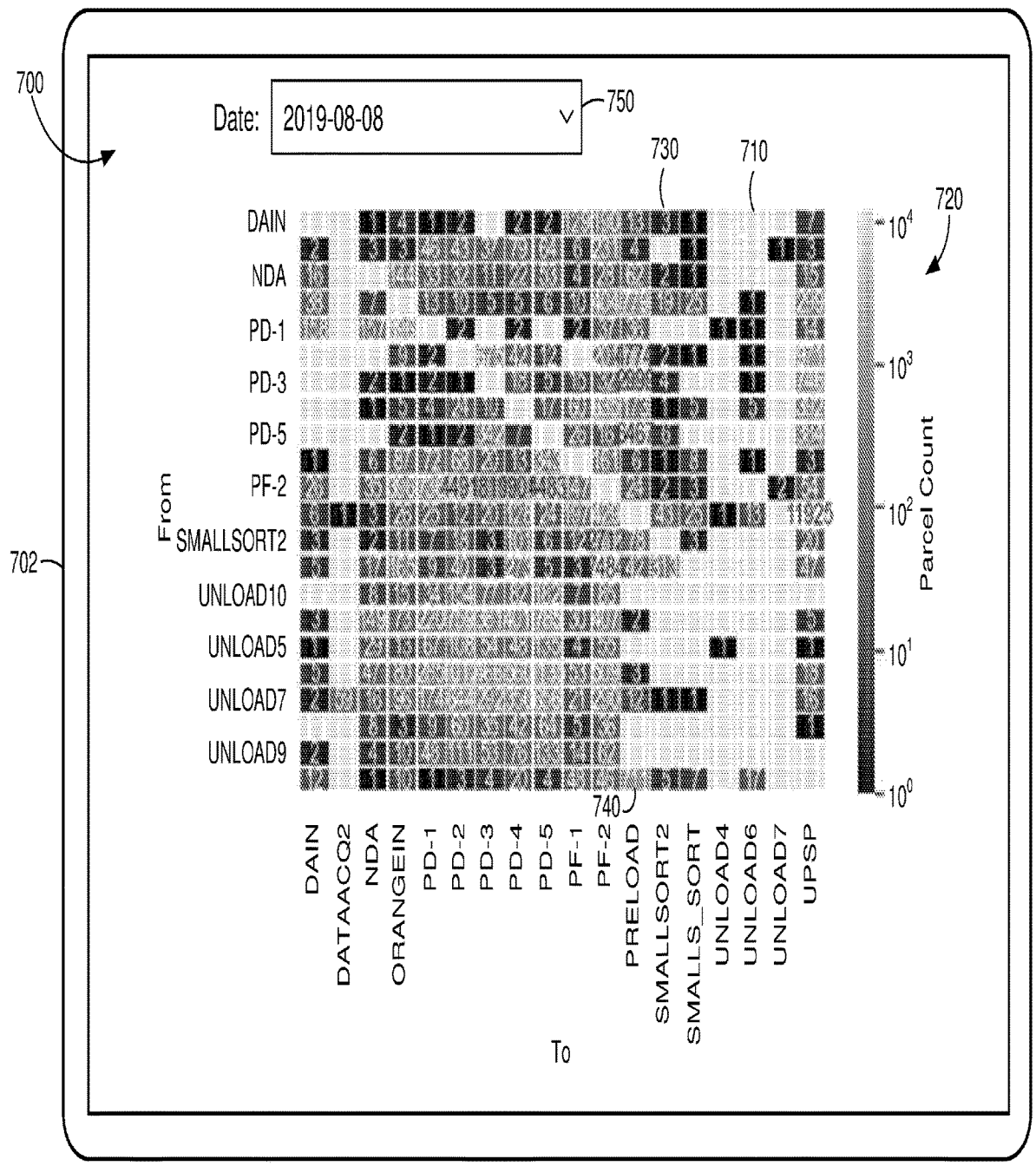
Figure 8:
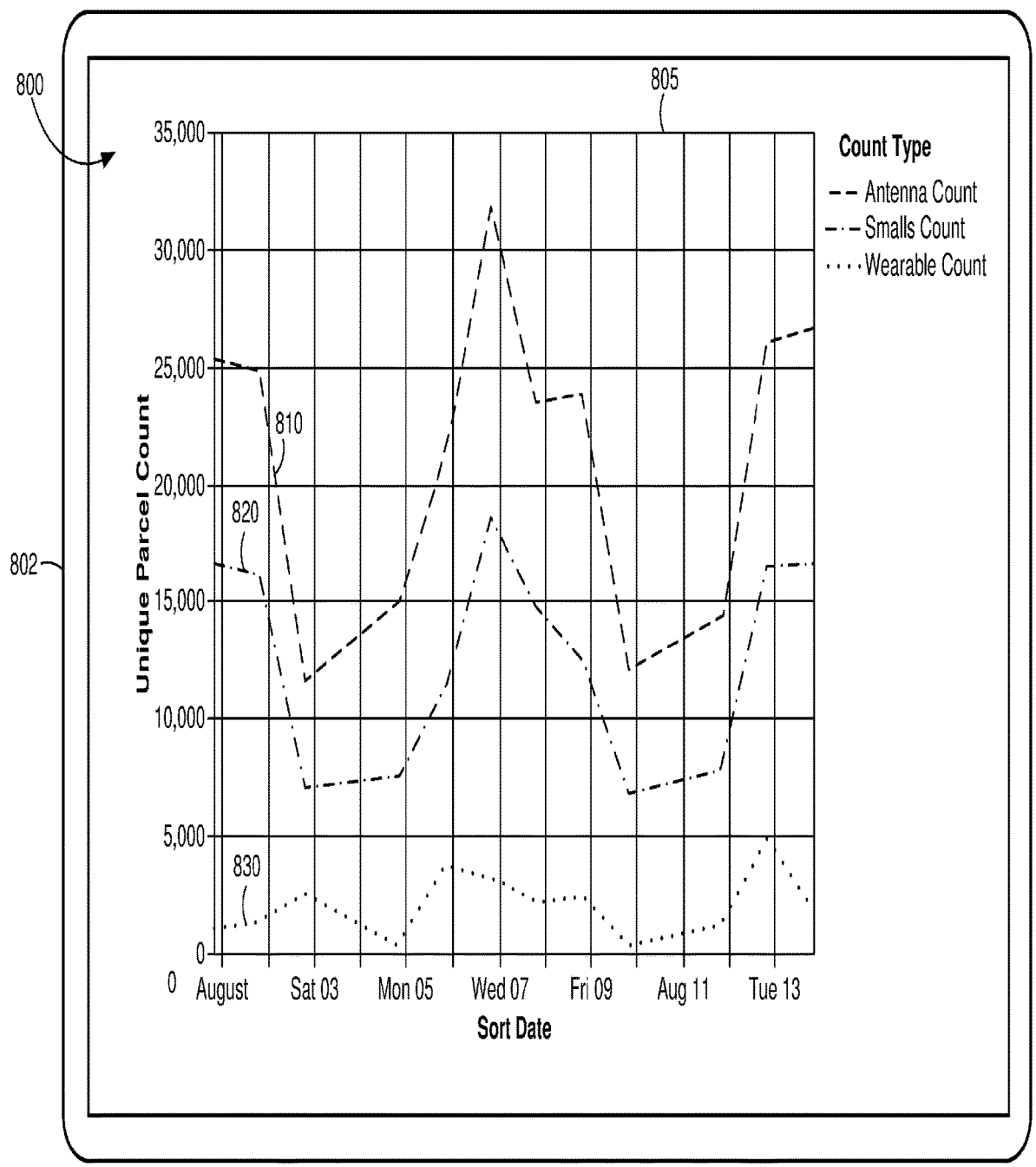
Figure 9A:
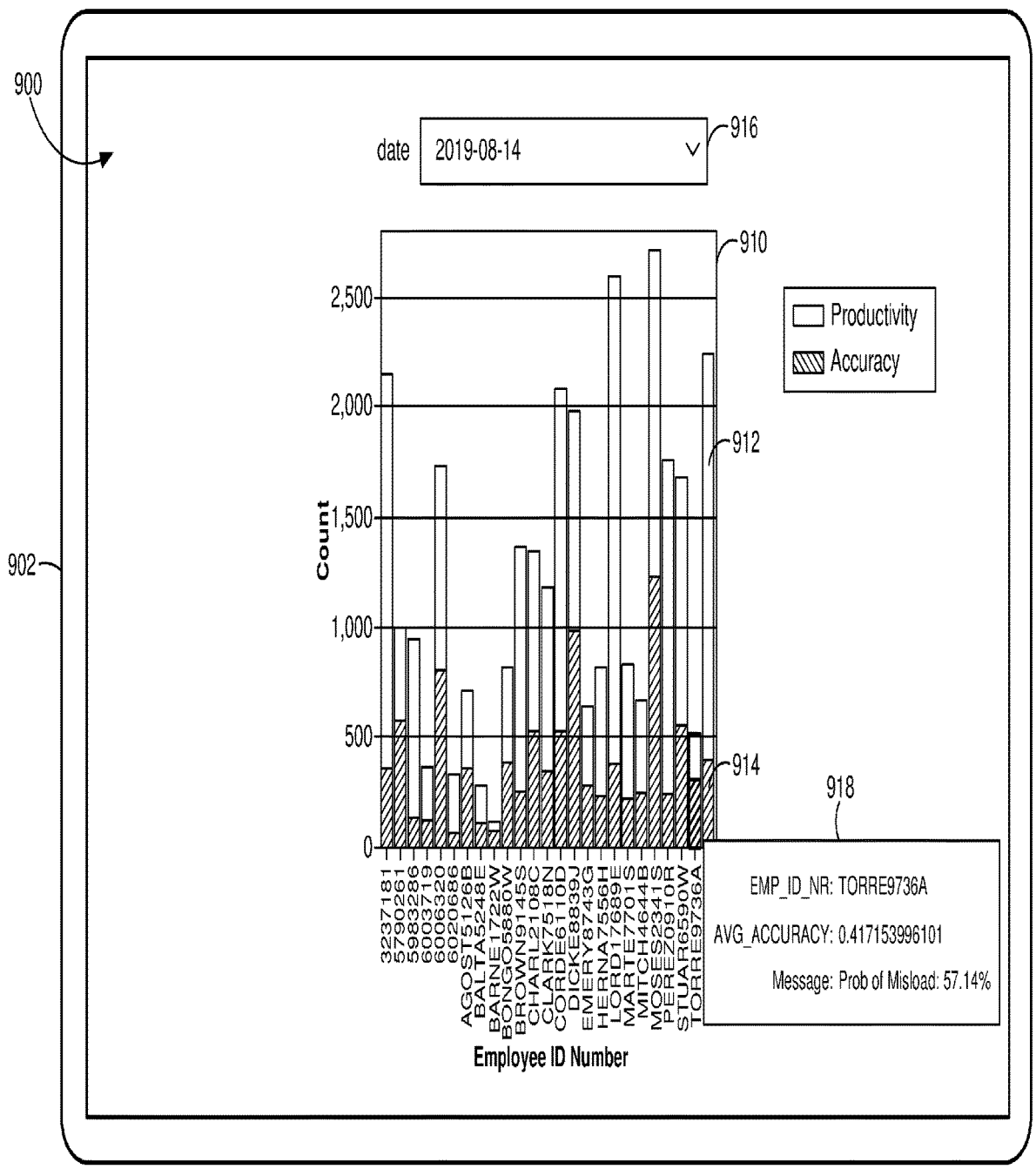
Figure 9B:
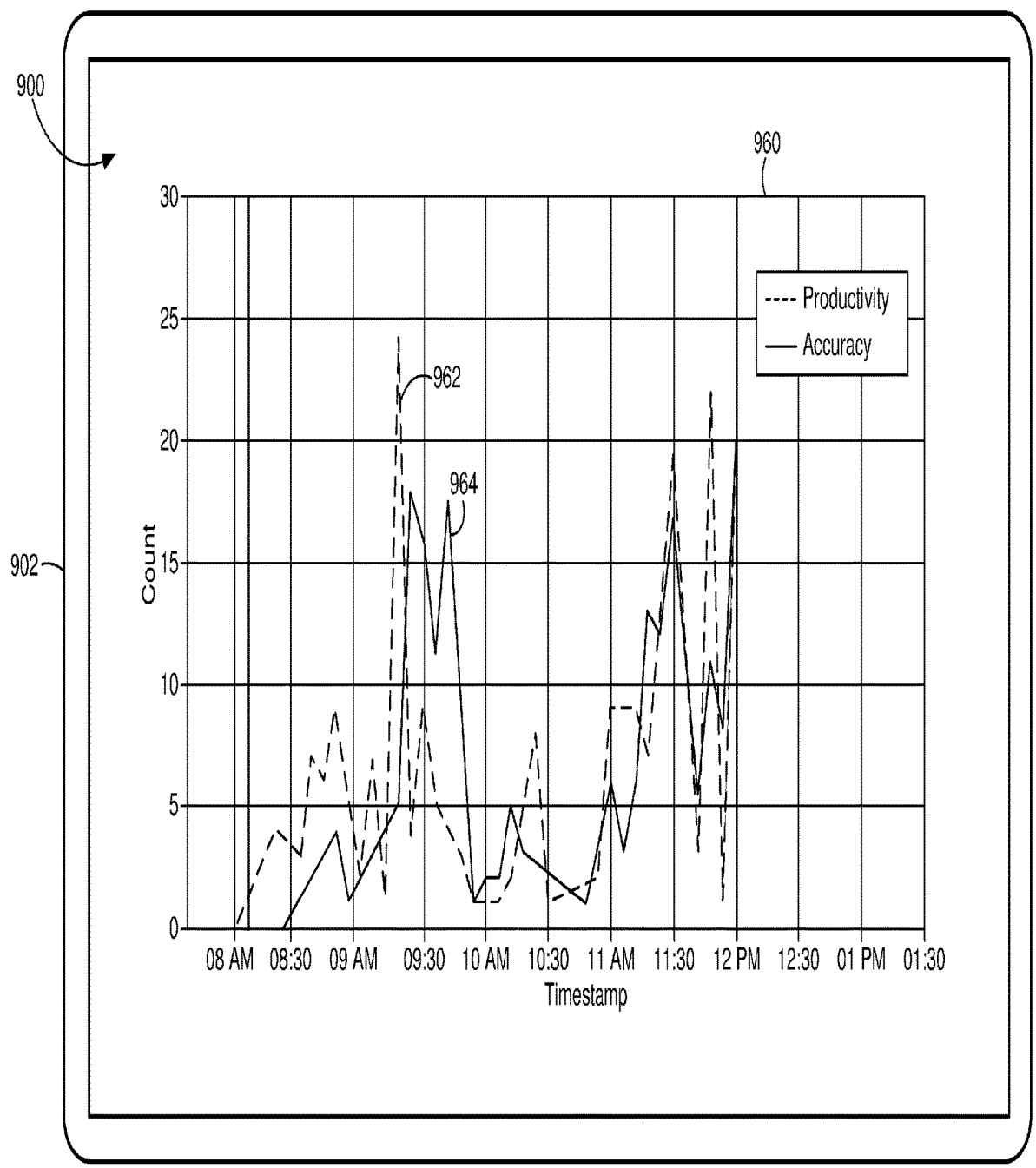
Figure 10:
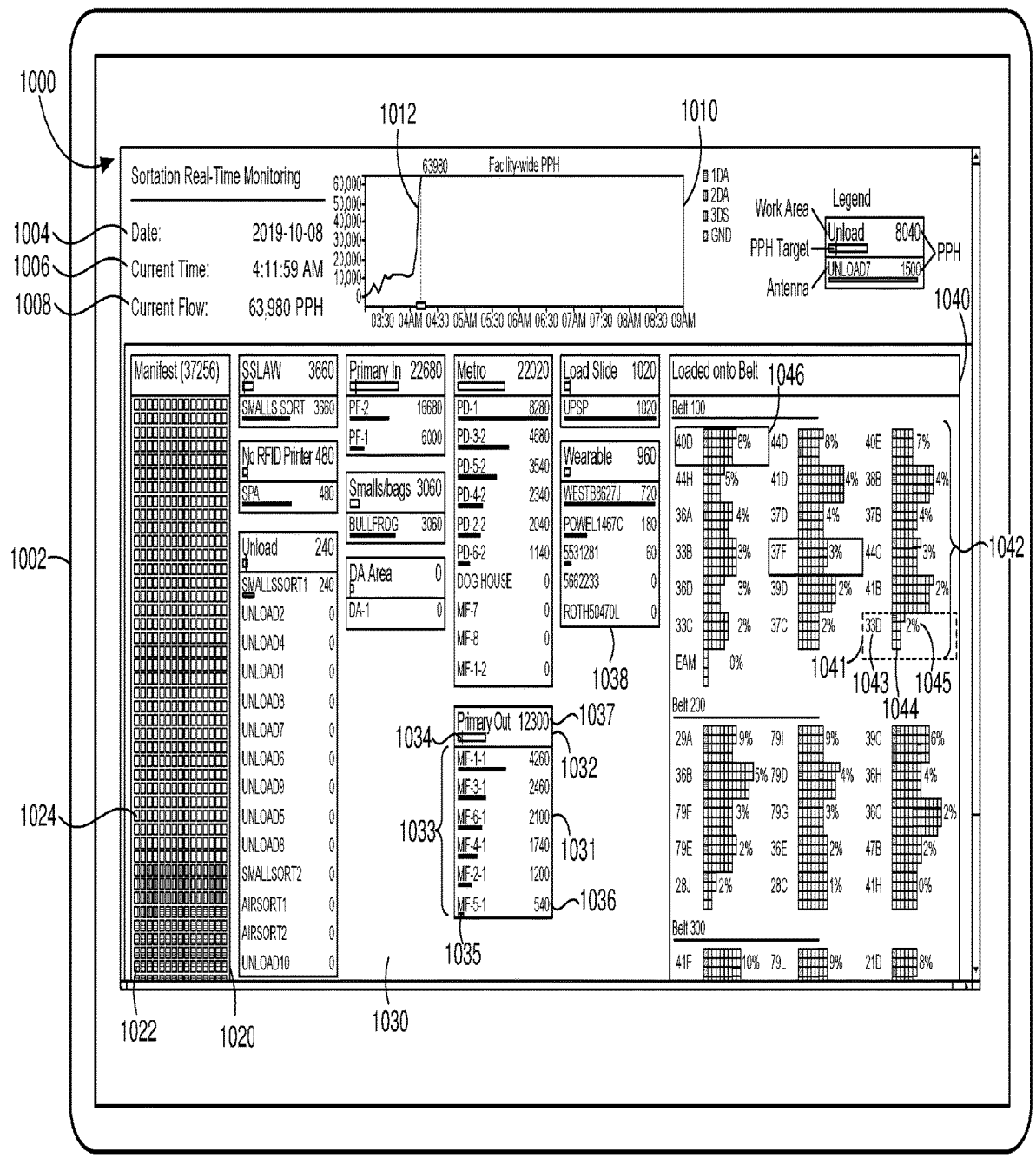
Figure 11:
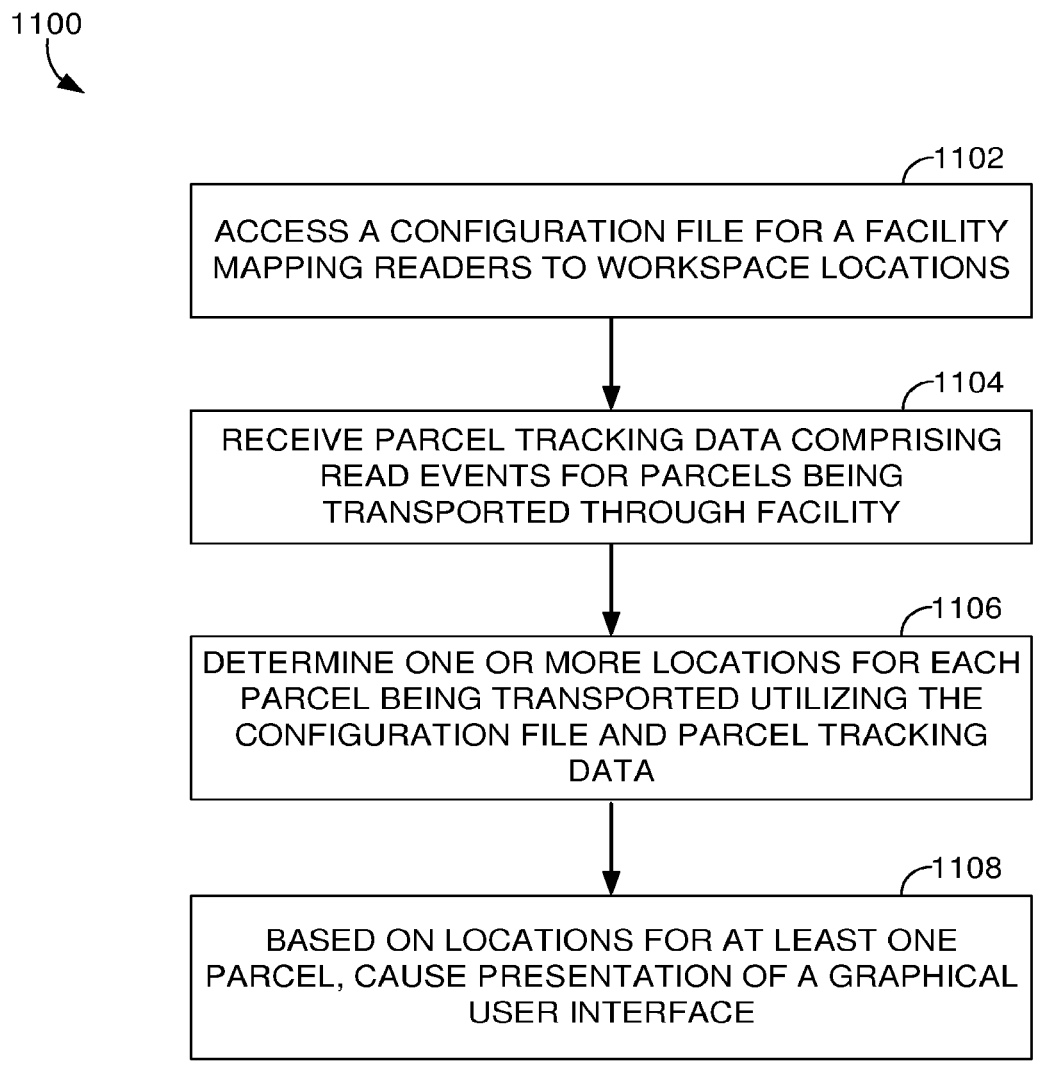
Figure 12:
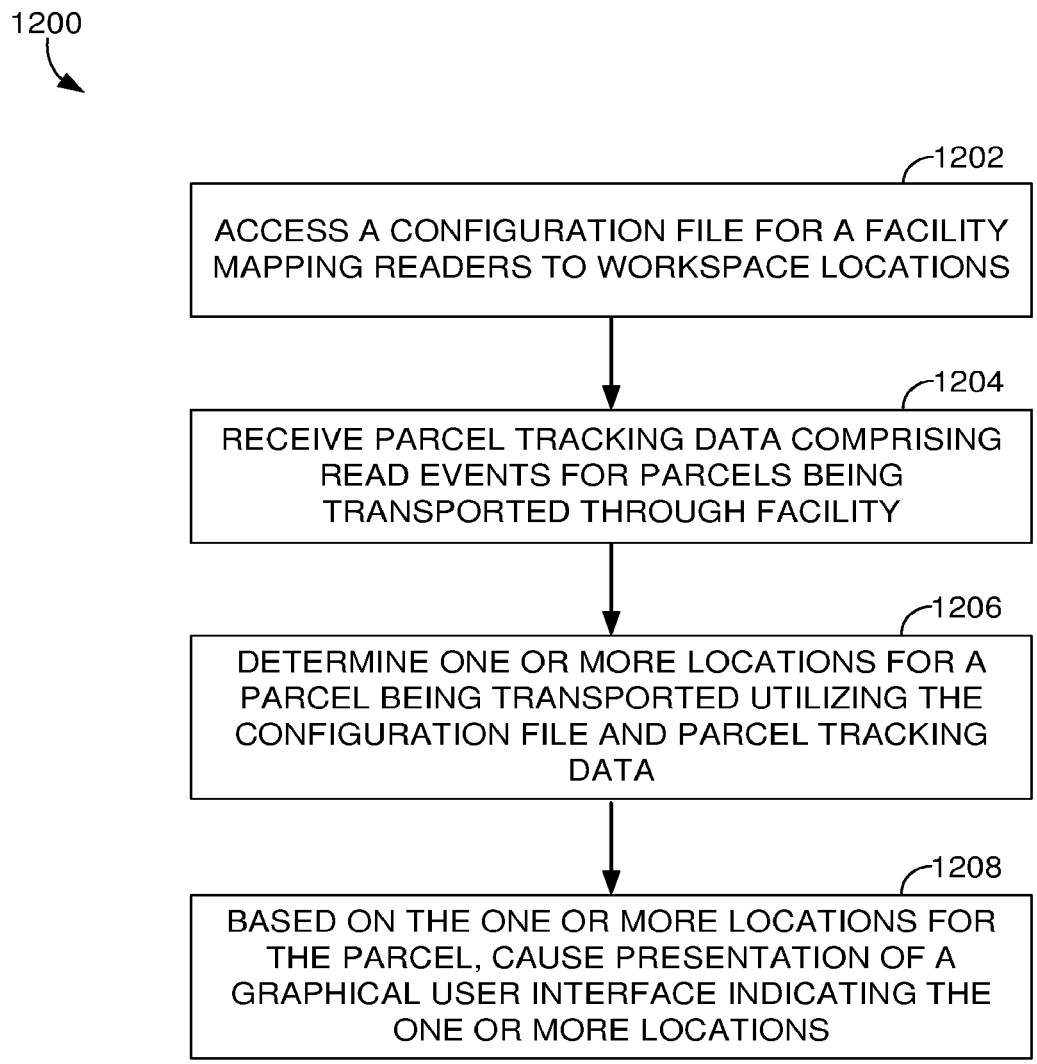
Figure 13:
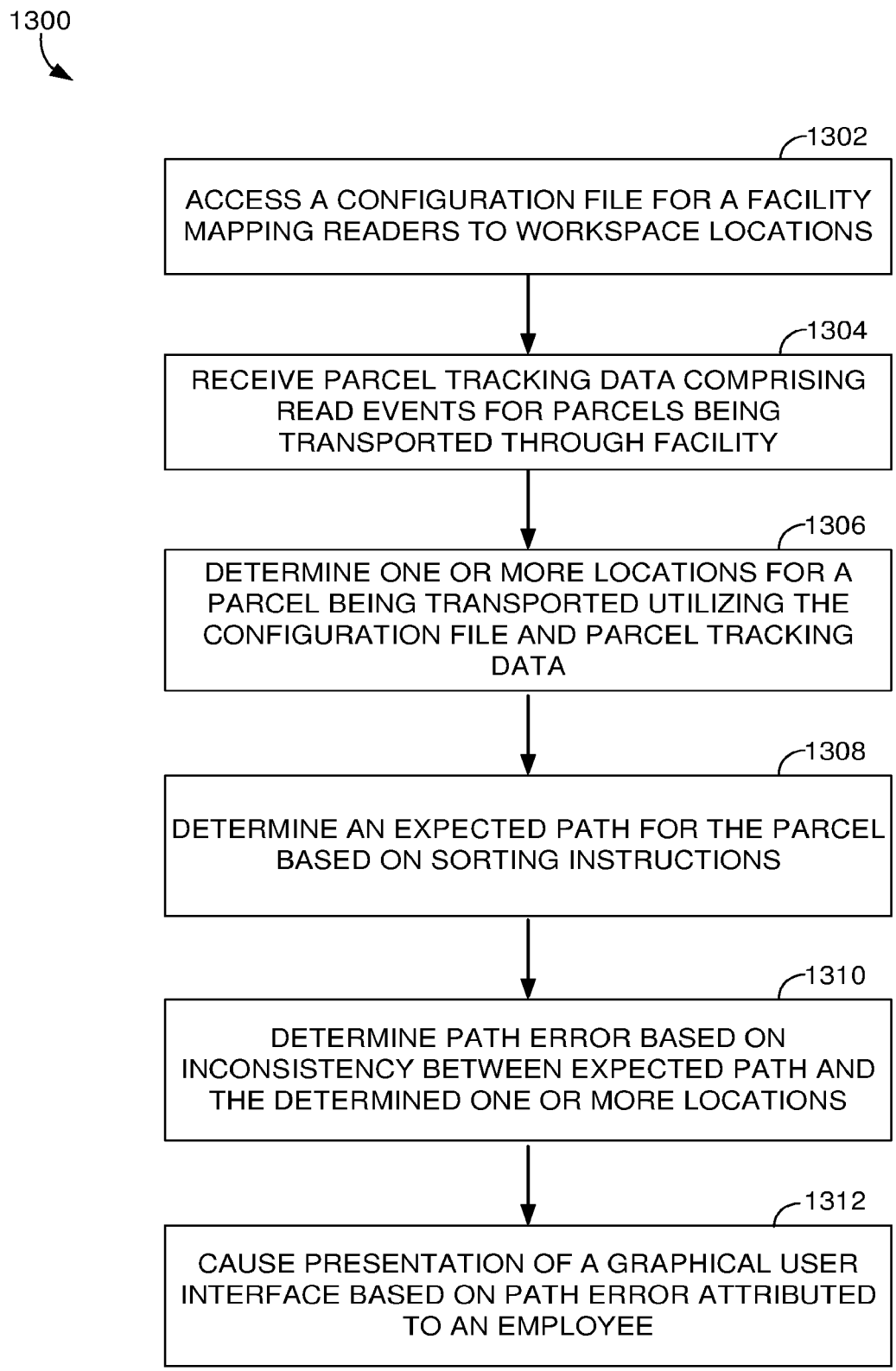
Figure 14:
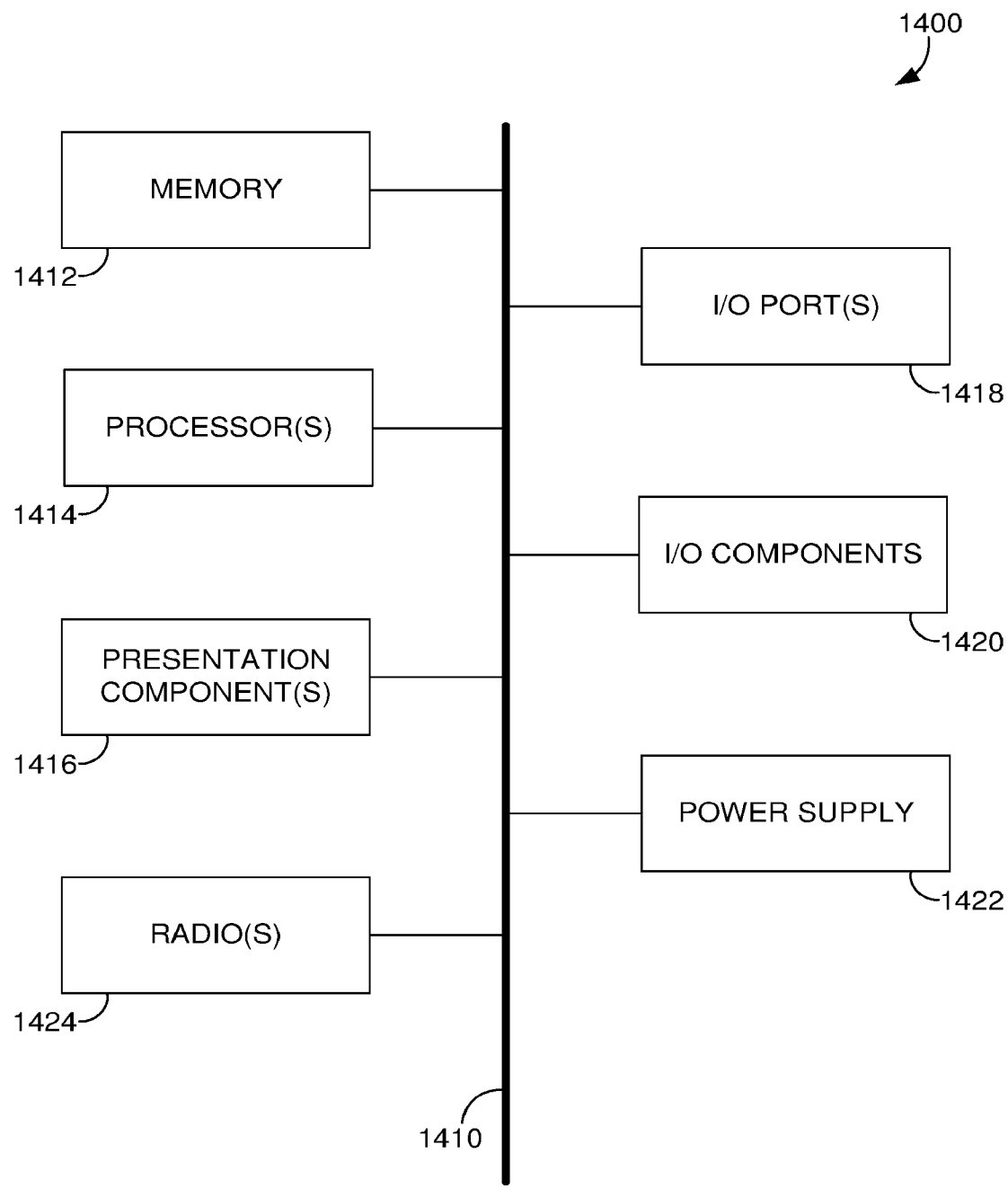

Having thus described the disclosure in general terms, reference will now be made to the accompanying drawings, which are not necessarily drawn to scale, and wherein:

FIG. 1 is a diagram of an example operating environment in which aspects of the present disclosure are employed according to embodiments of the present disclosure;

FIG. 2 is a diagram of an example computing system architecture in which aspects of the present disclosure are employed according to embodiments of the present disclosure;

FIG. 3 depicts an illustrative portion of an example facility with workspace locations through which a parcel may be tracked according to embodiments of the present disclosure;

Figure 4:
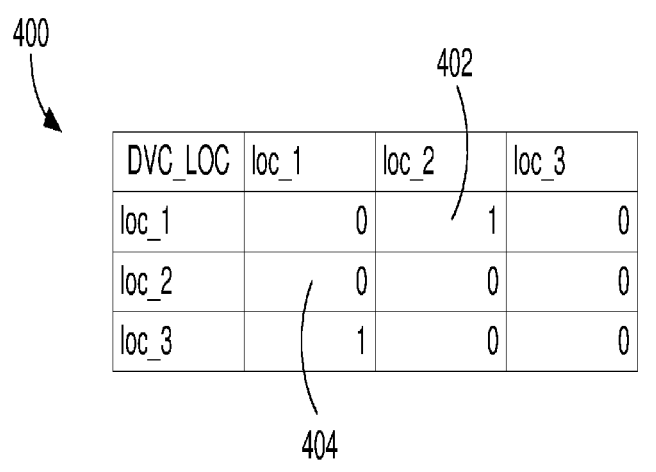

FIG. 4 depicts an example location adjacency matrix of a configuration file generated according to embodiments of the present disclosure;

FIG. 5 depicts an example parcel tracking graphical user interface generated according to embodiments of the present disclosure;

FIGS. 6A-6F depict a sequence of screenshots of an example graphical user interface generated according to embodiments of the present disclosure for tracking a parcel;

FIGS. 7 and 8 depict example graphical user interfaces for tracking parcel volume according to embodiments of the present disclosure;

FIGS. 9A and 9B depict example graphical user interfaces for tracking employee performance according to embodiments of the present disclosure;

FIG. 10 depicts an example graphical user interface in the form of a tracking dashboard according to embodiments of the present disclosure;

FIG. 11 depicts a flow diagram of an example process for generating a graphical user interface for tracking operations, according to embodiments of the present disclosure;

FIG. 12 depicts a flow diagram of an example process for generating a graphical user interface for tracking parcel location(s), according to embodiments of the present disclosure;

FIG. 13 depicts a flow diagram of an example process for generating a graphical user interface for tracking employee performance, according to embodiments of the present disclosure; and FIG. 14 is a block diagram of an exemplary computing environment suitable for use in implementing an embodiment of the present disclosure.

DETAILED DESCRIPTION OF THE INVENTION

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps disclosed herein unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-useable instructions stored on computer storage media. The methods may be provided by a stand-alone application, a service or hosted service (stand-alone or in combination with another hosted service), or a plug-in to another product, to name a few.

Aspects of the present disclosure relate to technology for improving tracking of parcels and operations within a facility, such as a sorting facility, through improved graphical user interfaces. As explained above, sorting facilities are utilized in logistics networks to sort parcels received from different locations into common destinations. These facilities have increasingly grown in physical size and complexity of operations within the facilities. Additionally, parcels are often transported through a facility on various conveyor apparatuses with periods of time with minimal to no human intervention, and, when parcels are moved or transitioned by an employee, the operation is typically very quick due to the high volume of parcels being processed. Currently, parcels are scanned as they are being unloaded into a facility and as they are being loaded into a carrier for transportation into the next destination; but there is little to no tracking of a parcel as it is moved between these two points within a facility. As a result, when an error occurs, such as a misload error, existing technologies do not typically detect the error until well after it occurs, increasing the risk of additional errors and reducing the efficiency of any correction.

To improve the failures to accurately track parcels and efficiently identify and resolve errors in the existing technology, embodiments of the present disclosure utilize read events captured by readers positioned through a facility to track parcel transportation through the facility. Readers with sensors, which may comprise radio-frequency identification (RFID) devices, may be mapped to particular workspace locations within a facility. Readers may be coupled to or integrated with static physical structures within the facility and/or into wearable devices that may be worn by employees.

As parcels move through a facility, the readers may capture parcel information and time information. The mapping of the readers to the workspace locations, which may be referred to here as a configuration file, may be utilized to identify the locations of the parcels. A sequence of workspace locations comprising a path may be determined based on a plurality of read events for a parcel. The configuration may indicate valid connections between two workspace locations such that determining the path may be based on identifying workspace locations having valid connections. Further, in exemplary aspects, the path may be determined as the most likely path by identifying valid connections between two detected locations and utilizing an edit distance algorithm determined utilizing historical parcel tracking data to identify the most likely path.

Utilizing the read events from parcel tracking data and the configuration file, a number of visualizations may be generated as a graphical user interface and provided to a user, via a user device, to facility tracking of parcel flow and, in some instances, operations within the facility. The graphical user interface generated in accordance with embodiments of this disclosure may provide specific, relevant, and update information about facility operations, such as identifying a particular parcel location to a particular locations within the facility, without requiring a user to scan through unnecessary imaging or other electronic data on a graphical user interface to identify a parcel location as is the case with conventional technologies. For example, the graphical user interface may comprises a visual representation of the facility with each workspace location, such as a virtual map, and include location indicators for one or more parcels. The location indicators within the facility representation may be positioned to correspond to the locations determined from parcel tracking data. In some instances, each determined location for a parcel is indicated, and in other instances, only the most recently determined location for a parcel is shown. In exemplary embodiments, the parcel tracking data is received in real time as a parcel is being transported and, as such, the graphical user interface may be updated in real time to provide the current location information. As used throughout this disclosure, the term "real time" includes any time frame of sufficiently short duration as to provide reasonable response time for information processing as described. Additionally, the term "real time" includes what is commonly termed "near real time," generally any time frame of sufficiently short duration as to provide reasonable response time for on-demand information processing as described (e.g., within a portion of a second or within a few seconds). These terms, while difficult to precisely define, are well understood by those skilled in the art. Updating a graphical user interface with parcel tracking location in real time as it is being moved through a facility, rather after it has moved through the facility, improves upon existing technologies in which a graphical user interface is not providing up-to-date information about facility operations or may not be include an electronic notification of an error until long after an error occurs.

Additionally, path errors may be determined from the parcel tracking data and indicated to a user via a graphical user interface. A path error, which may result from a misload or missort, may occur when the path determined for a parcel does not match the expected path for that parcel. In exemplary aspects, the expected path is determined based on sorting instructions for the parcel. When there is an inconsistency between the determined path and the expected path, an error notification may be generated on a graphical user interface. Further, in some embodiments, instructions for correcting the error may be determined and, once the path is determined to be on the expected path, a previous path error notification may be removed.

In some embodiments, a slowdown error is detected and indicated through the graphical user interface. The configuration file may indicate a threshold time period for traversing a subpath between two workspace locations. The threshold time period may be determined based on historical parcel tracking data. Utilizing time information from read events for successive locations, a duration of time it took to move between the locations is determined and compared to the threshold time period. If the determined duration exceeds or meets or exceeds the threshold period, a slowdown is detected. A slowdown may be indicated on a visual representation (e.g., map) of the facility within the detected location and/or may be included within an error notification.

Further, in some embodiments, the graphical user interface indicates volume(s) of parcels based on determined locations. For example, a volume of parcels that have been at each workspace location may be determined by aggregated unique parcels with read events from the workspace location that is included in the generated path. The graphical user interface may indicate a total parcel count for each workspace location for a period of time or may show changes in parcel counts over time. As new parcel tracking data is received, the graphical user interface may be updated with new parcel counts.

Further, in some embodiments, the read events are attributed to employee(s) of the facility, and the graphical user interface indicates employee performance based on the attributed read events. Employees may be assigned to a reader, and read events captured by the reader during the assigned time are attributed to the associated employee. The read events may be utilized to determine measures of productivity and/or accuracy. A productivity indicator within the graphical user interface may indicate productivity of an employee and may be a measure of the parcel count for the given time period. For example, total parcel count may be determined by aggregated unique parcels with read events attributed to a particular employee. Where errors are detected from read events attributed to an employee, the error may also be attributed to the employee. As such, accuracy may be determined based on the accurate (non-error) read events out of the total read events attributed to an employee, and a graphical user interface may be generated to indicate an employee's accuracy. Further, an employee's accuracy and/or productivity indicators may be updated as additional read events are captured as described herein.

Turning now to FIG. 1, a block diagram is provided showing an example operating environment 100 in which some embodiments of the present disclosure may be employed. It should be understood that this arrangement and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes one or more computing devices, such as user device 102; a number of data sources, such as data source 104; a number of servers, such as server 106; a number of readers, such as reader 108; and network 110. It should be understood that environment 100 shown in FIG. 1 is an example of one suitable operating environment. Each of the components shown in FIG. 1 may be implemented via any type of computing device, such as computing device 1400 described in connection to FIG. 14, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, readers, servers, and data sources may be employed within operating environment 100 within the scope of the present disclosure. Each component in environment 100 may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User device 102 may be a client user device on the client-side of operating environment 100, while server 106 may be on the server-side of operating environment 100. Server 106 may comprise server-side software designed to work in conjunction with client-side software on user device 102 so as to implement any combination of the features and functionalities discussed in the present disclosure. This division of operating environment 100 is provided to illustrate one example of a suitable environment, and there is no requirement for each implementation that any combination of server 106 and user device 102 remain as separate entities.

User device 102 may comprise any type of computing device capable of use by a user. For example, in one embodiment, user device 102 may be the type of computing device described in relation to FIG. 14 herein. By way of example and not limitation, a user device may be embodied as a personal computer (PC), a laptop computer, a mobile or mobile device, a smartphone, a Delivery Information Acquisition Device (DIAD), a smart speaker, a tablet computer, a smart watch, a wearable computer, a personal digital assistant (PDA) device, a workstation, or any combination of these delineated devices, or any other suitable computer device.

Reader 108 may comprise any device capable of receiving information within a surrounding geographical environment. Reader 108 may include an antenna, transmitter, receiver, and a processing unit. For example, in one embodiment, reader 108 may be a computing device described in relation to FIG. 14 herein. In one embodiment, reader 108 is a radio frequency transmitter and receiver configured to read information from and, in some instances, write information to an RFID tag as described further with respect to FIGS. 2 and 3. As previously stated, it is contemplated that embodiments of reader 108 may represent a plurality of readers forming operating environment 100.

Data source 104 may comprise one or more data bases and/or data systems configured to make data available to any of the various constituents of operating environment 100, or system 200 described in connection to FIG. 2. Data source 104 may be discrete from user device 102 and server 106 or may be incorporated and/or integrated into at least one of those components. In one embodiment, data source 104 comprise one or more sensors integrated into or associated with user device 102, server 106, reader 108, and/or one or more other components, such as a parcel described further with respect to FIG. 3.

Operating environment 100 can be utilized to implement one or more of the components of system 200, described in FIG. 2. Operating environment 100 also can be utilized for implementing aspects of methods 1100 and 1200, described in FIGS. 11 and 12, respectively and for generating graphical user interfaces 500, 600, 700, 800, 900, and 950 of FIGS. 5, 6A-6F, 7, 8, and 9A-9B, respectively.

Referring now to FIG. 2 and with continuing reference to FIG. 1, a block diagram is provided showing aspects of an example computing system architecture suitable for implementing an embodiment of this disclosure and designated generally as system 200. System 200 represents only one example of a suitable computing system architecture. Other arrangements and elements can be used in addition to or instead of those shown, and some elements may be omitted altogether for the sake of clarity. Further, many of the elements described herein are functional entities that, as with operating environment 100, may be implemented as discrete or distributed components or in conjunction with other components, and in any suitable combination and location.

Example system 200 includes network 110, which is described in connection to FIG. 1 and which communicatively couples components of system 200, including mapping component 210, path generator 220, operations tracker 230, presentation component 240, and data store 250. One or more of these components may be embodied as a set of compiled computer instructions or functions, program modules, computer software services, or an arrangement of processes carried out on one or more computer systems, such as computing device 1400 described in connection to FIG. 14, for example.

In one embodiment, the functions performed by components of system 200 are associated with one or more computerized facility operations applications, services or routines that mange operations at a facility, such as sorting operations at a sorting facility. Such applications, services, or routines may operate on one or more user devices (such as user device 102), servers (such as server 106), may be distributed across one or more user devices and servers, or be implemented in the cloud. Moreover, in some embodiments, these components of system 200 may be distributed across a network, including one or more servers (such as server 106) and client devices (such as user device 102), in the cloud, and/or may reside on a user device, such as user device 102. Additionally, although functionality is described herein with regards to specific components shown in example system 200, it is contemplated that, in some embodiments, functionality of these components can be shared or distributed across other components.

Mapping component 210 may generally be configured to facilitate the creation and maintenance of a mapping of sensors within a geographical environment, such as a facility. As previously stated, embodiments of this invention may include a plurality of sensors configured to track parcels being transported through a facility, such as a sorting facility. Turning briefly to FIG. 3, a schematic diagram of an environment 300 is provided to illustrate how one or more parcels may interact with various sensor components within a facility. Environment 300 may be a sorting facility as described herein. Environment 300 may include a plurality of conveyor apparatuses, such as conveyor apparatus 310A and conveyor apparatus 310B, which may be collectively or generally referred to as conveyor apparatus(es) 310 unless otherwise noted). Each conveyor apparatus 310 may be responsible for shifting parcels, such as parcels 320A, 320B, and 320C, which may be collectively or generally referred to as parcel(s) 320 unless otherwise noted, from one position to another in environment 300. Conveyor apparatuses 310 within environment 300 may be directly or indirectly coupled to one another such that a parcel being moved by one conveyor apparatus (e.g., 310A) may be subsequently moved by another conveyor apparatus (e.g., 310B). In some embodiments, the term "conveyor apparatus" may include any suitable assembly that includes a conveyor belt (continuous medium that carries parcels from one location to another) and/or one or more rollers or idlers that either rotate the belt or rotate (without a belt) such that parcels are moved.

Environment 300 further includes a plurality of sensors, such as readers 330A, 330B, and 330C, which may be collectively or generally referred to as reader(s) 330 unless otherwise noted, that are positioned to "read" data from parcels being moved along a conveyor apparatus 310. A reader 330 determines information about a parcel from a tag affixed to a parcel, such as tag 322A affixed to parcel 320A. In some embodiments, a reader 330 may be integrated into a conveyor apparatus 310, such as reader 330A integrated into conveyor apparatus 310A. Additionally or alternatively, a reader 330 may be integrated into other structures, such as reader 330B that is configured to read tags on parcels on conveyor 310B but may be affixed to a separate structure within environment 300. Further, while readers 330A and 330B are depicted as being relatively static in their position in that readers 330A and 330B are each installed on a physical structure, other readers, such as reader 330C may be integrated into a portable and/or wearable device. For instance, reader 330C is part of a wearable device worn by an employee that may be responsible for physically moving parcels, coordinating the movement of parcels, or monitoring the movement of parcels.

As previously mentioned, each reader 330 may include a sensor that is configured to read tags or other identifying information on a parcel 320 that is within a threshold geographical range and/or signal strength. For example, reader 330A may be positioned so that it can read tag 322 on parcel 320A as parcel 320A is moved along conveyor apparatus 310A. Reader 330A and tag 322A represent example components for this discussion, but it is understood that each of readers 330B and 330C and tags 322B and 322C may operate in a similar manner unless otherwise noted. Within environment 300, a reader 330 may read tags 322 for multiple parcels 320. For instance, reader 330A may, at different points in time, read tags 322A and 322C to obtain information on parcels 320A and 320C, respectively. Additionally, it is contemplated that a tag 322 on a parcel 320 may be read by multiple readers 330 as the parcel 320 is transported through environment. For example, tag 322C on parcel 320C may be read by readers 330A and 330C when a parcel 320 is within a threshold distance of each respective reader.

Embodiments of readers 330 (such as reader 330A) and tags 322 (such as tag 322A) in environment 300 may be radio-frequency identification (RFID) devices, near-field communication (NFC) devices, or any other suitable combination of reader and/or tag devices equipped that communicate, via either one-way or two-way communication, when in a threshold geographical range and/or signal strength. For instance, tag 322A affixed to parcel 320A may include a radio transponder to receive signals from and transmit signals to a reader 330A, and reader 330A may include a receiver or, in some embodiments, a transponder to receive and transmit signals. Readers 330 and tags 322 may communicate via active, passive, or semi-passive communication. For example, one embodiment of a tag 322 may include an active RFID tag with at least one input interface for connecting with sensors located in a reader 330. Another embodiment of a tag 322 may be a passive RFID tag that is interrogated by an interrogator signal from a reader 330 before transmitting signals to the reader 330 in response.

It is understood that, in some embodiments, a tag 322 and a reader 330 are not limited to RFID, NFC, or similar technologies but may broadly include other embodiments where any data is read from any suitable medium. For example, a tag 322 may comprise or include a paper or other medium that includes a barcode, QR code, data matrix code, smart code, or other code or computer-readable indicia of identifiers. In these embodiments, any suitable associated machine reader can be used to read the code of identifiers, such as an electronic scanner (e.g., a bar code scanner) or device with an optical or infrared sensor. Accordingly, reader 330 may represent an electronic scanner, QR code reader, or any variety of suitable readers.

A tag 322 may provide (actively or passively) identifying information about a parcel 320 to which the tag 322 is coupled, such as a parcel identification number. Additional identifying information may be provided, such as destination, type, and size of a parcel 320. For example, FIG. 3 depicts tag 322A including a parcel ID number, destination, size, and type of parcel for parcel 320A. In some embodiments, a reader 330 may utilize RFID or NFC technology to receive signals with some identifying information from a tag 332 but may also include an optical sensor for determining other information about a parcel 320. In some embodiments, a tag 322 includes an internal clock and includes a time when sending the signal to a reader 330. Additionally or alternatively, reader 330 may have an internal clock to associate a time of signal receipt with the identifying information received from tag 322. Further, an indication of signal strength received from a tag 322 may be determined and associated with the signal. For instance, signal strength may be stronger when the signal is received by a reader 330 that is closer to a tag 322, such as a signal from tag 322A to reader 330A in FIG. 3. Additionally, if an optical sensor is utilized, a reader 330 may receive an indication of the position of a tag 322 based on the view of the tag 322 from the optical sensor.

As described with respect to FIG. 1, reader 330 may be communicatively coupled to one or more user devices, such as user device 102 and/or one or more servers 106, either of which may be executing functions of components of computing system 200 described herein. Alternatively or additionally, a reader 330 may be communicatively coupled to a data store, such as data store 250 of FIG. 2, to store information that will be utilized by one or more other components of computing system 200. As such, the information provided by a reader 3330, including the information from a tag 322, may be utilized to create a mapping of a facility (e.g., environment 300), track parcels, and/or track operations within the facility. In some embodiments, a reader 330 may also be communicatively coupled to one or more other components responsible for transporting parcels within facility. For example, information from a reader 330 may be utilized to adjust operations for one or more conveyor apparatuses 310 as well as loading/unloading apparatuses and/or storage units within a facility.

It will be appreciated that there are various routes each parcel could take within a sorting facility based on different factors, such as the location at which the parcel is unloaded, the next shipping destination, parcel type, parcel size, which conveyor apparatuses are operating, and/or the existence and location of any blockages on a conveyor apparatus, for example. The path of each parcel may be tracked utilizing information from sensors, such as readers 330 in FIG. 3, and a mapping of the sensors within the facility. Mapping component 210 in system 200 may create a mapping, which may also be referred to herein as a configuration file, assigning sensors to workspaces within the facility. As used herein, a "workspace" may refer to a discrete geographical location with the facility that may be utilized in sorting parcels. A workspace may be a physical structure or at least part of a physical structure within the facility. Generally, each workspace is within at least part of the range of the sensor such that each workspace indicates a particular geographical area in which the sensor can read tags on parcels. In some embodiments, a workspace may represent an entire conveyor apparatus or a portion of a conveyor apparatus. A workspace may also represent a loading or unloading dock, a shaft or chute, a platform, a storage container, a holding area, or a transition area. With reference to FIG. 3, for example, reader 330A may be mapped to a section of conveyor apparatus 310A; reader 330B may be mapped to a section of conveyor apparatus 310B; and reader 330C may be mapped to a transition area or juncture between the end of conveyor apparatus 310A and another conveyor apparatus or package cart.

The configuration file representing the mapping may include a list of sensors within a sorting facility or an area to be monitored within the sorting facility. The sensors in the configuration file may correspond to wearable devices, such as reader 330C, or readers on fixed physical locations, such as readers 330A and 330B. For each sensor, a workspace is assigned and, in exemplary embodiments, additional information identifying properties of the sensor and/or location is assigned. For example, for each sensor, the configuration file may indicate a type of sensor, which may be an operation corresponding to a workspace. Examples of types of sensors may include unload, primary in, primary out, metro, DA area, wearable, package car, high value, sure post, SLAW and/or small sort. Additionally, the configuration file may indicate whether the sensor is a start node or an end node. As used herein, a start node represents a location that is the start of a valid parcel path (e.g., where a path is unloaded into the facility), and an end node represents a location that is the end of a valid parcel path (e.g., where a parcel is deposited to be transported away from the sorting facility). Generally, sensors that do not represent a start node or an end node represent an intermediate location that a parcel may go through between a start node and an end node when traveling through the facility.

In some embodiments, the configuration file further indicates whether there are multiple antennas on the sensor, and some embodiments indicate whether there are print instructions assigned to the workspace location to indicate if any print operations for a parcel are performed at the location. Additionally, in some embodiments, X/Y coordinates may be identified. The X/Y coordinates may be the coordinates of the sensor itself or may be a central area of the assigned workspace location. Where X/Y coordinates are included in the configuration file, the X/Y coordinates may be determined according to a Cartesian coordinate system representing the sorting facility such that the origin of the coordinate system may be defined by a location of the facility (e.g., bottom left corner of the facility).

In exemplary embodiments, the configuration file further includes location adjacency information that indicates valid connections or transitions between workspace locations. As used herein, a valid connection refers to two workspace locations being adjacent one another such that a parcel may be read by a sensor in a first workspace location immediately before being read by a sensor in a second workspace location while traveling through the facility in accordance with a predetermined path. For purposes of indicating valid connections in a configuration file, the predetermined path may be considered one of the paths that could be chosen for any given parcel. As described in greater detail below, there may be instances in which a parcel is not on a correct path due to a misprint, an employee error, and/or conveyor apparatus transition error. In these instances, the parcel may still on the wrong path for the particular parcel but may still be on a path with valid connections between sensor reads. Non-valid connections, however, may occur when a parcel successive reads for a parcel do not match any path on which a parcel may go, such as what may occur if a parcel accidently falls from one conveyor apparatus to another.

In exemplary embodiments, valid connections are indicated in a location adjacency matrix within the configuration file. An example location adjacency matrix 400 is depicted in FIG. 4. Location adjacency matrix 400 includes valid connections between locations 1, 2, and 3; it should be understood that location adjacency matrix 400 is provided as a simplified example and that a location adjacency matrices within a configuration file for a facility may have many more workspace locations.

Each workspace location in a configuration file may be represented by both a row and a column with a location adjacency matrix. Each cell within a location adjacency matrix may include either a "1" to indicate that there is a valid connection between the two locations corresponding to the row and column or a "0" to indicate there is not a valid connection between the two locations. Location adjacency matrix 400 may also indicate directional relationships between the locations such that the particular order for sensor reads with valid connections are identified. In some embodiments, a row indicates a prior location and a column indicates a subsequent location such that a cell at the intersection of a row and column indicates whether there is a valid connection from the workspace of the row to the workspace of the column. For example, a valid path for a parcel within location adjacency matrix 400 may be from location 1 to location 2 to location 3, in that order. As such, location adjacency matrix 400 indicates a valid connection at cell 402 when going from location 1 and location 2 but an invalid connection at cell 404 when going from location 2 to location 1.

In exemplary embodiments, someone with knowledge of the facility may create an initial mapping of sensors to workspace locations. As such, mapping component 210 may receive input from a user indicating information for the configuration file, including the location adjacency matrix. The initial mapping and adjacency information may be validated using data of parcels moving through the facility. As such, in some embodiments, mapping component 210 receives reference parcel tracking data that includes a plurality of scan for parcels moving through the facility. The reference parcel tracking data may be received from storage, such as data store 250, or directly from sensors, such as readers 108 in FIG. 1. The reference parcel tracking data may be compared to the configuration file to identify potential errors in the configuration file. For instance, the reference parcel tracking data may be utilized to check for missing expected location properties, for missing values recorded for location properties, whether every location is either a start node or validly follows at least one other location, whether every location is either an end node or validly precedes at least one other location, and whether every location in the reference parcel tracking data exists in the configuration file. Additionally, mapping component 210 may determine whether any location in the reference parcel tracking data appears for the start of a path for a parcel but is not identified as a valid start node in the configuration file, whether any location in the reference parcel tracking data appears for the end of a path for a parcel but is not identified as a valid end node in the configuration file, and whether every transition in the reference parcel tracking data is valid according to the configuration file. Any error, which may represent a mismatch between the reference parcel tracking data and what is expected from the configuration file, may be flagged. In some embodiments, the error is flagged for manual review by a user, and the user may determine whether to update the configuration file to be consistent with the reference parcel tracking data. The updated configuration file may be saved to storage, such as data store 250.

In some embodiments, location adjacency information may be automatically determined from reference parcel tracking data. For example, valid connections may be determined by applying one or more machine learning algorithms to the reference parcel tracking data. In some embodiments, identifying locations as start nodes and stop nodes may also be performed automatically.

In some instances, updating information in the configuration file may be based on a relocation or reconfiguration of a sensor. For example, based on a comparison of the configuration file and the reference parcel tracking data, a missing read from a sensor may be detected where the reference parcel tracking data does not include a read that is expected from the valid connections in the configuration file. Additionally, a bleeding read from a sensor may be detected where the reference parcel tracking data includes reads of the same parcel from two sensors within a pre-determined time window, indicating that one sensor is reading parcels in a workspace location assigned to another sensor. In response to the detected missing reads and bleeding reads, one or more sensor locations and configurations may be adjusted to reduce the likelihood of future errors, and the configuration file may be updated to reflect the changes to the sensor.

The configuration file may be utilized to identify paths of parcels being transported through the facility based on new parcel tracking data from sensors. Path generator 220 in FIG. 2 may generally be configured to generate paths of a parcel as it moves through the facility based on parcel tracking data from a plurality of sensors. As a parcel is moved through the facility, multiple sensors (e.g., readers 330) may read a tag (e.g., 322) attached to the parcel and the information from those reads (referred to as parcel tracking data) may be utilized to determine locations of the parcel within the facility, including determining likely transitions from one location to another. As such, for each parcel, path generator 220 may aggregate the parcel's parcel tracking data provided by multiple sensors and determine a sequence of workspace locations matching each read event (e.g., a scan of a tag by a sensor) in the parcel tracking data utilizing the configuration file.

In some embodiments, the parcel tracking data is cleaned before being used to generate parcel paths. Cleaning may include, for each read event in the parcel tracking data, normalizing read properties to enable comparison of strings, data, and timestamps, replace invalid signal strengths with full strength values, normalize location values to distinguish wearable sensors from static sensors as indicated by the sensor type in the configuration file, remove all read events that are exact duplicates, and remove read events without certain information, such as a parcel ID, time stamp, or sensor identifier. In some embodiments, cleaning may include additional functions, such as removing read events for parcels with parcel IDs that do not match a valid format, remove scans for parcels with a total number of read events exceeding a threshold amount, and remove read events for packages that are flagged as having left the facility. In some embodiments, the functions that are performed during cleaning may be user-specified functions.

Utilizing the parcel tracking data for a package, which may be cleaned as described above, path generator 220 may determine a chronological sequence of read events based on the time stamps of each read event and determine a chronological sequence of the workspace locations corresponding to the sensors associated with the read events. For example, if parcel tracking data has read events associated with the same parcel ID with time stamps of 10:42:10 a.m., 10:45:50 a.m., and 10:49:50 a.m. from sensors assigned to workspace locations A, B, and C, respectively, path generator may determine that the path for the particular parcel goes from A to B to C.

Due at least to the high volume of parcels sorted in a facility, the number of sensors, and the overlap of paths, generating a path for a parcel may include determining a most likely location from multiple locations that are associated with read events for the same parcel. In some embodiments, parcel tracking data is received from sensors for a plurality of parcels. As such, generating a path may include first sorting the read events occurring to a common parcel ID and then by time stamp. For each unique parcel ID, the time stamps for corresponding read events are utilized to determine potential locations within a predetermined window of time. For each read event, the amount of time since the previous read event with the same parcel ID is calculated and compared to a predetermined window of time, such as five seconds. If the amount of time calculated satisfies the window, the read event may be considered "in window". In exemplary embodiments, satisfying the predetermined window of time comprises not exceeding the predetermined window of time. Additionally, in some embodiments, a read event may defined as "in window" even if it is out of the predetermined window (i.e., exceeds the predetermined window) when the previous location and the location of the new sensor event are the same, indicating that the parcel has not moved. A read event that does not satisfy the predetermined window of time may be considered to be "not in window". If a read event is "in window", it may be consolidated with other read events for that window of time, and a read event that is "not in window" may be added to the subsequent window of time.

As it can be appreciated, there may be multiple read events for the same window of time for the same parcel ID. As such, path generator 220 may determine the most likely location for the parcel for that window of time. Where the read events are from the same sensor, the location of the parcel is determined to be the workspace location assigned to that sensor. However, there may be instances in which multiple sensors are providing read event data for the same parcel ID within the same window of time. In exemplary embodiments, path generator 220 applies one or more heuristic rules to determine which read event (and, thus, which sensor) should be utilized in determining the workspace location for the window of time. In some embodiments, path generator 220 may determine the most likely location by determining the read event that occurs first within the window of time and determining the workspace location assigned the sensor providing that read event. In other embodiments, path generator 220 may determine the most likely location by determining the read event that has the highest signal strength value out of all the read events within the window of time for a particular parcel and determining the workspace location assigned to the sensor that provided that read event with the highest signal strength value. Still, in other embodiments, path generator 220 may select the most likely location to be the most commonly occurring location, where the most commonly occurring location may be a location that appears most frequently in reference tracking data, a location that appears most frequently in for tracking data for all parcels within that facility for a given time frame, or a location that appears most often for the particular parcel being tracked within that window of time. In another embodiment, path generator 220 may select the most likely location of a parcel for a given window of time to be the most recent location.

After determining a location for each window of time in which a read event was received for the parcel, path generator 220 may combine the determined locations to create a raw path for the parcel. The raw path may represent an initial determination of the chronological sequence of workspace locations in which a parcel moved through within the facility.

Path generator 220 may amend the raw path by inserting new locations and/or deleting existing locations in the raw path. The amendments may be made in response to detecting errors (e.g., invalid start/end nodes or illegal transitions) in the raw path utilizing the configuration file. For example, for the first location within the raw path, which represents the first location chronologically, path generator 220 may determine whether the location is identified as a valid start node in the configuration file. If the first location is not a valid start node, path generator 220 may determine that either the first location is incorrect or another location should be added to the beginning of the raw path. A similar determination may be made with respect to the whether the last location within the raw path is identified as a valid end node in the configuration file. Additionally, path generator 220 may identify an illegal transition by determining that a pair of successive locations in the raw path do not form a valid transition identified in the configuration file. For example, if the raw path includes a sequence of locations A, E, F, G, and I, and the configuration file identifies locations B and C as the only next valid locations after location A, then location E may be determined to represent an invalid location, indicating that either location E should be changed or one or more additional locations should be inserted between locations A and E.

For each error detected, path generator 220 may determine possible alternative paths by adding and/or deleting locations so that the path for a parcel ID includes a valid start node, valid transitions, and, in some aspects, valid end nodes. This process may result in multiple valid alternative paths being identified, and path generator 220 may apply one or more algorithms to automatically determine the most likely path. For instance, in exemplary aspects, path generator 220 may utilize an edit distance algorithm to automatically determine the most likely path. When applying edit distance, the total number of amendments required to change the raw path to an alternative path is determined. In some embodiments, amendments to a possible path are weighted in by the likelihood of occurrence, which may be determined based on historical parcel tracking data, where amendments resulting in transitions that occur more frequently in the historical data may be weighted in favor of a more likely path (e.g., weighted less for a lower edit distance). In some aspects, the possible amended path with the lowest edit distance is selected as the path for the parcel.

In this way, path generator 220 determines the likely path that a parcel took through a facility. Further, in exemplary embodiments, path generator 220 determines the path that a parcel takes in real time or near real time such that paths for parcels may be determined while the parcels are still being transported through the facility. In embodiments in which paths are determined in real time or near real time, the determined path may be only a partial path reflecting the path that the parcel has taken thus far as indicated by the parcel tracking data that has been received. In some embodiments, path generator 220 receives parcel tracking data continuously. In some embodiments, path generator 220 receives the parcel tracking data in regular intervals, such as every minute. Paths determined for a parcel may be updated as additional tracking data is received with read events for that parcel. Newly received parcel tracking data for a parcel may not only indicate new locations but may be utilized to revise locations previously determined within the path. Because path generator 220 may determine partial paths, in some embodiments, path generator 220 does not determine valid end nodes as the parcel may not have reached a valid end node within the facility yet. In some embodiments, path generator 220 only determines if there is a valid end node in the parcel tracking data for a parcel where time elapsed since either the last read event or the first read event for the parcel exceeds a predetermined threshold amount of time, indicating that the parcel likely has left the facility.

Embodiments of system 200 may further comprise operations tracker 230 that is generally configured to utilize paths generated for one or more parcels to track operations within a sorting facility. As shown in FIG. 2, embodiments of operations tracker 230 may further include path error detector 232, slowdown detector 234, employee attributor 236, and volume determiner 238. Operations tracker 230 or any of the subcomponents may be implemented on the same computing device, as mapping component 210 and/or path generator 220 or may be implemented on a separate computing device, such as a separate server, such that these functionalities may be performed in a distributed architecture.

Path error detector 232 may generally be configured to detect an error in the path a parcel is taking or has taken through the facility. Generally, a path error occurs when a parcel's path, as determined by path generator 220, does not match the path expected to be taken by the parcel based on how the parcel was to be sorted. A path error may be due to a misload of the parcel when transportation has started or a missort of the parcel during transportation and, as such, may be referred to herein as a missort or a misload. In some instances, the path error occurs because of a misprint of loading instructions for the parcel or an employee placing the parcel on the wrong bed or conveyor apparatus.

When a parcel is being unloaded into the sorting facility, an initial read event may occur by a sensor, and an expected path may be determined based on the next intended destination for the parcel after the sorting facility (e.g., the shipping destination or next facility within the network). In some embodiments, the expected path may also be determined based on parcel type and/or parcel size. Path error detector 232 may compare the path actually being taken by a parcel (as determined by path generator 220) and the expected path determined based on the initial read event. When a location within the path (i.e., chronological sequence of workspace locations) determined by path generator 220 is inconsistent with the expected path for the parcel, path error detector 232 may determine that a path error has occurred.

In exemplary embodiments, a graphical user interface component is generated in response to a path error being detected by path error detector 232 as described below with respect to presentation component 240 as well as FIGS. 5, 6A-6F, and 10. In some embodiments, path error detector 232 may also determine a next workspace location to which the parcel should be transported in order to put the parcel on the expected path. This next location may be the location within the expected path that is nearest the current location of the parcel. Further, in some aspects, only some of the locations along a path may allow for automatic or human intervention to correct a parcel's path. These locations, which may be referred to as check point locations, may each be a workspace location in which transportation of the parcel may be stopped and transported in another direction, either via an employee or signals sent to one or more arms, shafts, and/or conveyor apparatus components. In such embodiments, path error detector 232 may determine the nearest check point location on the parcel's current path and send a signal to a sorting component, such as a conveyor apparatus, and/or a user device so that the parcel is picked up at the identified check point location and transported, either manually or automatically, to a workspace location on the expected path.

Slowdown detector 234 is generally responsible for determining when the rate of parcel transportation has slowed down within a the facility or a particular area of the facility. A slowdown, for instance, may occur due to high parcel volume, obstructed path, and/or faulty or broken equipment. As a result, at least some parcels may not be transported through the facility as quickly as expected. Slowdown detector 234 may utilize time information from read events to determine the length of time it took a parcel to move between workspace locations within a parcel's determined path. For instance, path generator 220 may determine that a parcel has traveled between location A and location B based on a read event taken at 10:42 am by a reader mapped to location A and a read event taken at 10:50 am by a reader mapped to location B. Based on this information, it may be determined that it took the parcel eight minutes to move from location A to location B.

Slowdown detector 234 may determine the presence of a slowdown by comparing the length of time it takes a parcel to move between two locations to a predetermined threshold length of time. The predetermined threshold length of time may be specific to the two locations being considered for the parcel (e.g., there may be a threshold time specific to traversing between locations A and B and another threshold time specific to traversing between locations B and C). The threshold length of time between two particular locations may be based on historical parcel tracking data. The threshold length of time to traverse two locations may be a set deviation from the average length of time (e.g., one standard deviation, two standard deviations, etc.) it took parcels to move between those two locations in the historical parcel tracking data. In another embodiment, the threshold length of time is based on a set variance from the average length of time determined from historical parcel tracking data. For instance, if the average length of time is 2 minutes and 15 seconds, the predetermined threshold length may approximately 10% greater than the average length, or 2 minutes and 29 seconds. The set variance amount (i.e., 10% in the previous example) may be the same among for different pairs of workspace locations or may be different. Alternatively, the threshold length of time may be defined by a user. The predetermined length of time for a path may be determined from the configuration file or may be retrieved from another data store.

In exemplary aspects, slowdown detector 234 may determine that a slowdown has occurred when the length of time it takes for a parcel to be transported between two locations satisfies the predetermined threshold length of time. The predetermined threshold length of time may be satisfied when the determined length of time of the parcel being tracked is greater than or equal to the threshold length of time or, in other aspects, when the determined length of time is greater than the threshold length of time.

Although the two locations utilized for detecting slowdowns may be a start node and an end node within in a sorting facility (such as unloading and loading locations), it would be beneficial to detect slowdowns on a more granular level within the facility to more quickly identify a problem as parcels are in the process of being transported. As such, the two locations considered by slowdown detector 234 may form a subpath of a larger path of the parcel, and the predetermined threshold length of time may be specific to the subpath. In some embodiments, a threshold length of time for each valid subpath (i.e., subpath between two locations with a valid connection) is included in the configuration file. As parcel tracking data for a particular parcel is being received and the path is being determined, slowdown detector 234 may detect slowdowns by comparing the length of time it takes the parcel to complete each subpath with the respective threshold length of time. In response to detecting a slowdown, a signal may be sent to one or more user devices to provide an alert of the slowdown so that it may be remedied. The alert may be provided in the form of a graphical user interface component generated in response to the slowdown being detected by slowdown detector 234 as described below with respect to presentation component 240 and FIG. 6C.

In some embodiments, a slowdown may also be detected when multiple read events for the same parcel identify the parcel as being at the same workspace location for over a predetermined threshold of time. In this instance, it may be determined that the parcel is not moving past the workspace location. The multiple read events may be from the same reader, and, in some embodiments, the predetermined threshold length of time applied for a parcel at the same location may be less than the predetermined threshold length of time applied when a parcel moves between different locations. Alternatively, a slowdown from a parcel not moving past a workspace location may be identified based on the number of successive read events with the same parcel ID from the same reader. For example, if the number of successive read events for a particular parcel (as identified by the parcel ID) from a reader meets a threshold number, it may be determined that the parcel is not moving from the workspace location associated with that reader.

Employee attributor 236 is generally responsible for attributing parcel reads and errors to specific employees working within the facility. At least some of the readers used to read parcels being transported through the facility may be assigned to a particular employee. For example, an employee wearing a wearable reader may be assigned to that reader indefinitely or temporarily during a specific time frame, such as during an employee's shift. Assignments of a reader to an employee may be done at the start of an employee's shift, when an employee signs into or otherwise checks out a reader device, or when the employee reports to a particular workspace location with the reader. It is further contemplated that each employee may be assigned his or her own reader indefinitely such that the assignment of a reader to an employee may not strictly coincide with when the employee is working. Assignments of a reader to an employee may be stored in a data base, such as data store 250.

In some embodiments, the assignments of readers to an employee may include associated dates and times. For instance, the assignment of a reader may include a start time, which may be the date and time at which the employee was assigned to the reader. The start time may correspond to when an employee's shift begins, when the employee checks out a reader, and/or when the employee logs into an electronic reader. The assignment of a reader may also include a stop time, which may be the date and time that the employee stopped being assigned to the reader. The stop time may correspond to when an employee's shift ends, when the employee checks in a reader, when the employee logs out of a reader, and/or when a new employee is assigned to the same reader, such as by checking out or logging into the same reader.

As parcels are transported through the facility and read events occur, each read event provides information identifying the reader that is providing the read event data as well as the date and time of the read event, which may be utilized in identifying an employee who may be responsible for the read event or overseeing transportation of the parcel around the read event. In some embodiments, where readers are indefinitely assigned to a particular employee, identifying the employee may be done by retrieving an assignment of a reader to an employee without determining date and time information. Even in embodiments in which readers are temporarily assigned to employee, such as when a reader is assigned to new employee at the start of the employee's shift, attributing an employee to a read event may be done based on identifying the employee assigned to the reader that provided the read event data if the attribution determination is made within a threshold period of time such that there is a sufficient confidence that a new assignment had not been made between the time of the read event and the attribution.

In some embodiments, the time and date of the read event may also be utilized in identifying an employee for read event attribution. For instance, if a reader was assigned to employee 1 on May $1^{st}$ between 6 a.m. and 2 p.m. and then assigned to employee 2 on May $1^{st}$ between 2 p.m. and 10 p.m., the date and time stamp of a read event captured by that reader may be utilized in determining whether to attribute the read event to employee 1 or employee 2. Employee attributor 236 may attribute a read event captured at 11:30 a.m. to employee 1 for example.

Additionally, employee attributor 236 may attribute detected errors to particular employees. For at least some read events from which a path error (e.g., a misload or a missort), is detected, the error may be attributed to the employee assigned to the relevant reader during the time and date of the detected error. For example, if the expected parcel path is locations A, B, G, and H but the determined parcel path is locations A, B, C, and D, an error occurred as the parcel was transported from location B to location C instead of being transported from location B to location G, and the error may be attributed to an employee assigned to the reader mapped to location B. The date and time stamp of the parcel's read event at location B may also be utilized in identifying the employee responsible for the error.

In some embodiments, employee attributor 236 may determine one or more metrics for an employee based on the attributed read events and, in some aspects, errors. The one or more metrics determined by employee attributor 236 may include a productivity measure and an accuracy measure. A productivity measure may be a count of parcels that a particular employee has sorted during a relevant time period. The parcel count may be determined by aggregating all read events attributed to an employee within the relevant time period. A relevant time period may be an single shift of the employee, such as a 12-hour shift on a particular date, or may be a longer period, such as a week, one month, three months, or other lengths of time. In some embodiments, there may be multiple read events for the same parcel attributed to an employee and, as such, after all the read events are aggregated, read events in which there is a duplicate parcel ID may be removed so that the parcel count only includes read events for unique parcels.

An accuracy measurement may be a count of parcels that a particular employee missorted during a relevant time period and, as such, may be determined by aggregating the errors attributed to the particular employee within the relevant time period. In some embodiments, aggregating the errors includes removing a read event with a duplicate parcel ID such that the number of parcels utilized for the accuracy count only includes unique errors. Further, in some embodiments, the accuracy measurement is a measure of errors relative to productivity. As such, in some embodiments, the accuracy measurement may be the percentage of parcels without errors attributed to the employee out of the total count of parcels attributed to the employee. For instance, if an employee's parcel count is 200 during a relevant time period and the error count is 20, it may be determined that the number of parcels the employee sorted without errors is 180 and the accuracy measurement may be 90%. In this example, an error rate may be 10% for that employee.

Some embodiments of employee attributor 236 may further predict a likelihood of a particular employee causing a path error, such as a misload or missort. The error may be predicted utilizing one or more machine learning models. In exemplary aspects, a logistic regression model is employed to predict a probability of an error. Employee attributor 236 may utilize the machine learning model to predict an error based on the employee's historical accuracy information, such as error count and accuracy measurement. The error prediction output by employee attributor 236 may be a quantitative probability (e.g., 60% likelihood of an error for a particular employee) or a categorical probability (e.g., high, medium, or low likelihoods of an error for a particular employee).

Additional contextual information may be utilized, such as the workspace location, day of the week, the time, the time elapsed since the beginning of the shift, to predict an error for an employee. For instance, an employee may be more likely to make an error at the end of a shift or when it is late at night. The machine learning model may be trained utilizing data of a reference population or data for a specific employee. As such, the machine learning model may predict a probability of an error for an employee not only based on a generalized higher likelihood of errors occurring at the end of a shift but based on historical data for that particular employee showing more errors occurring at the end of the employee's shifts. The specific features utilized to train and run the machine learning model may be selected utilizing Least Absolute Shrinkage and Selection Operator (LASSO) technique. As such, in exemplary aspects, the employee attributor 236 may utilize a logistic regression LASSO model.

Volume determiner 238 is generally responsible for determining a parcel volume for one or more locations within a facility for a period of time. The time period over which a volume is determined may be set or modified by a user. In some aspects, the time period is an increment in minutes (e.g., 5 minutes or 10 minutes), in hours (e.g., 1 hour, 12 hours, 24 hours), or in longer periods of time.

Volume determiner 238 may determine parcel volume for a workspace location, a path or subpath, and/or an entire facility. To determine parcel volume for a workspace location, volume determiner 238 may determine the count of unique parcel IDs associated with paths (which may be generated by path generator 220) that contain the workspace location for a given period of time. Similarly, to determine parcel volume for a path or subpath, volume determiner 238 may determine the count of unique parcel IDs associated with the path or subpath, where a path or a subpath is defined by a sequence of locations. For instance, to determine a volume for subpath between location A and location B, the count of unique parcel IDs associated with a path containing the sequence of location A followed by location B would be determined by volume determiner 238. Additionally, volume determiner 238 may determine a volume of total parcels processed in a facility for a particular time by identifying a count of unique parcel IDs associated with read events in the parcel tracking data or, in some aspects, associated with all paths generated by path generator 220. In some embodiments, when determining the volume of parcels in a facility directly from parcel tracking data, volume determiner 238 may utilize only read events from a subset of readers, such as readers associated with loading or unloading workspace locations, to reduce the amount of read events that must be processed to identify the count of unique parcel IDs. In exemplary embodiments, a graphical user interface component is generated to indicate one or more volumes determined by volume determiner 238, as described further below with respect to presentation component 240 and FIGS. 7, 8, and 10.

System 200 may further include presentation component 240 that is generally responsible for presenting one or more outputs of components of system 200, such as a parcel path determined by path generator 220 or a facility operation determined by operations tracker 230, to a user. In one embodiment, path generator 220 and/or operations tracker 230 may operate in conjunction with or may be implemented as one part of presentation component 240. Presentation component 240 may comprise one or more applications or services on a user device, across multiple user devices, or in the cloud. For example, in one embodiment, presentation component 240 manages the presentation of communications, such as notifications and alerts, to a user across multiple user devices associated with that user. Based on presentation logic and/or other user data, presentation component 240 may determine on which user device(s) to present the content, as well as the context of the presentation, such as how to present (including in what format and how much content, which can be dependent on the user device or context), when to present, or other such aspects of presentation.

In some embodiments, presentation component 240 generates user interface (UI) features associated with or used to facilitate presenting to the user aspects of path generator 220 and operations tracker 230. Such features can include UI elements (such as icons or indicators, graphics buttons, sliders, menus, audio prompts, alerts, alarms, vibrations, pop-up windows, notification-bar or status-bar items, in-app notifications, or other similar features for interfacing with a user), queries, and prompts. One or more of these features may be combined to create a user interface, such as a graphical user interface, for tracking paths of parcels within a facility, operation errors, such as loading errors or an error resulting in a slowdown, volume of parcels within the facility, and/or employee productivity.

FIG. 5 depicts an example graphical user interface (GUI) 500 for tracking the path of a parcel within a sorting facility. GUI 500 may be generated by an embodiment of presentation component 240. GUI 500 may be displayed on a user device 502, which may be an embodiment of user device 102 in FIG. 1. GUI 500 may be provided on user device 502 as part of a parcel tracking application running on user device 502 or on a remote server accessed by user device 502.

GUI 500 may include UI elements that indicate previous or current locations of a parcel. A parcel identifier 520 includes text identifying the specific parcel for which a location is being tracked. In exemplary aspects, one of the features of GUI 500 may provide a schematic mapping of a parcel's track throughout the facility. For instance, GUI 500 includes parcel map 510 that schematically represents a layout of a sorting facility and identifies positions of the parcel identified by parcel identifier 520 within a facility. As such, parcel map 510 may depict one or more workspace locations at which a parcel may be found. For instance, parcel map 510 depicts a plurality of loading stations 540, a plurality of conveyor apparatuses 550, and a plurality of unloading stations 560. Additional workspace locations may be depicted depending on the layout of the specific sorting facility. Each workspace location within parcel map 510 may be mapped to one or more readers within a configuration file created by an embodiment of mapping component 210 of FIG. 2.

Parcel map 510 may further include one or more parcel location indicators that indicate a specific location (i.e., workspace location) of the parcel within the sorting facility. Additionally, determinations of the locations of the parcel represented in parcel map 510 may be done by an embodiment of path generator 220 of FIG. 2. In this way, parcel location indicators may be based on reads of the parcel as the parcel travels through the sorting facility that is represented in parcel map 510. Parcel map 510 has a location indicator 572 at unloading station 562, a location indicator 574 at a portion of conveyor 552 corresponding to PD-2A, a location indicator 576 at a portion of conveyor 552 corresponding to PD-2B, a location indicator 577 at a portion of conveyor 552 corresponding to PD-2C, a location indicator 578 at an end region of conveyor 552 corresponding to a preload area, and a location indicator 579 at a loading station 542. Parcel map 510 may further include one or more direction indicators, such as arrow 554, that indicate a direction in which the parcel is traveling along the path.

Graphical user interface 500 may include a location table 530 that includes descriptors for the locations at which a parcel was tracked in the facility and times corresponding to those locations. These times may be the times of read events from readers mapped to the identified workspace locations. As illustrated, each location in location table 530 corresponds to one of the location indicator(e.g., location indicator 572) in parcel map 510.

In exemplary aspects, one or more elements of GUI 500 are user interface elements that a user may interact with to modify GUI 500. For example, parcel identifier 520 may have functionality of a drop down menu and/or search bar that allows a user to search for or select another parcel. Upon selecting or searching for another parcel, parcel map 510 and location table 530 may be updated to reflect locations of the other parcel.

FIGS. 6A-6F depict a series of screenshots of an example graphical user interface (GUI) 600 that may be presented to a user to track a parcel as the parcel is moved throughout the facility. GUI 600 may be generated by an embodiment of presentation component 240 and utilizing one or more of the other components of system 200, such as path generator 220 and operations tracker 230. Further, GUI 600 may be displayed on a user device 602, which may be an embodiment of user device 102 in FIG. 1. GUI 600 may be provided on user device 602 as part of a parcel tracking application running on user device 602 or on a remote server accessed by user device 602.

Similar to GUI 500 of FIG. 5, GUI 600 depicted in FIGS. 6A-6F may include UI elements that indicate one or more locations of a parcel. As such, GUI 600 may include a parcel identifier 620 with a descriptor identifying the specific parcel for which a location is being tracked. GUI 600 may further include parcel map 610 that schematically represents a layout of a facility and identifies positions of the parcel identified by parcel identifier 620 within the facility. As such, parcel map 610 may depict one or more workspace locations at which a parcel may be found. For instance, parcel map 610 depicts a plurality of loading stations 640, a plurality of conveyor apparatuses 650, and a plurality of unloading stations 660. Additional workspace locations may be depicted depending on the layout of the specific sorting facility. Each workspace location within parcel map 610 may be mapped to one or more readers within a configuration file created by an embodiment of mapping component 210 of FIG. 2.

GUI 600 may also include location table 630 that includes descriptors for the locations at which a parcel was tracked in the facility and times corresponding to those locations. These times may be the times of read events from readers mapped to the identified workspace locations. As illustrated, each location in location table 630 may correspond to a location indicator, such as location indicator 672 discussed below, in parcel map 610.

As previously described, embodiments of the present disclosure may track the location of a parcel in real time as it is being moved through a facility. As such, GUI 600 may be updated in real time or as the parcel is being moved through the facility. The series of screenshots of GUI 600 in FIGS. 6A-6F depict GUI 600 being updated as additional determinations of a parcel's location is made, such as being updated with new locations in location table 630 and new or moved location indictors. Additionally, as described below, GUI 600 may be updated with one or more status alerts or warnings as the parcel is being moved and tracked through the facility. For simplicity, screenshots in FIGS. 6A-6F are provided to illustrate examples of updates to GUI 600 as a parcel is moved through facility; however, it is contemplated that there may be other updates to GUI that are not specifically depicted in a separate screenshot here but that may be presented to on a user device.

Figure 6A:
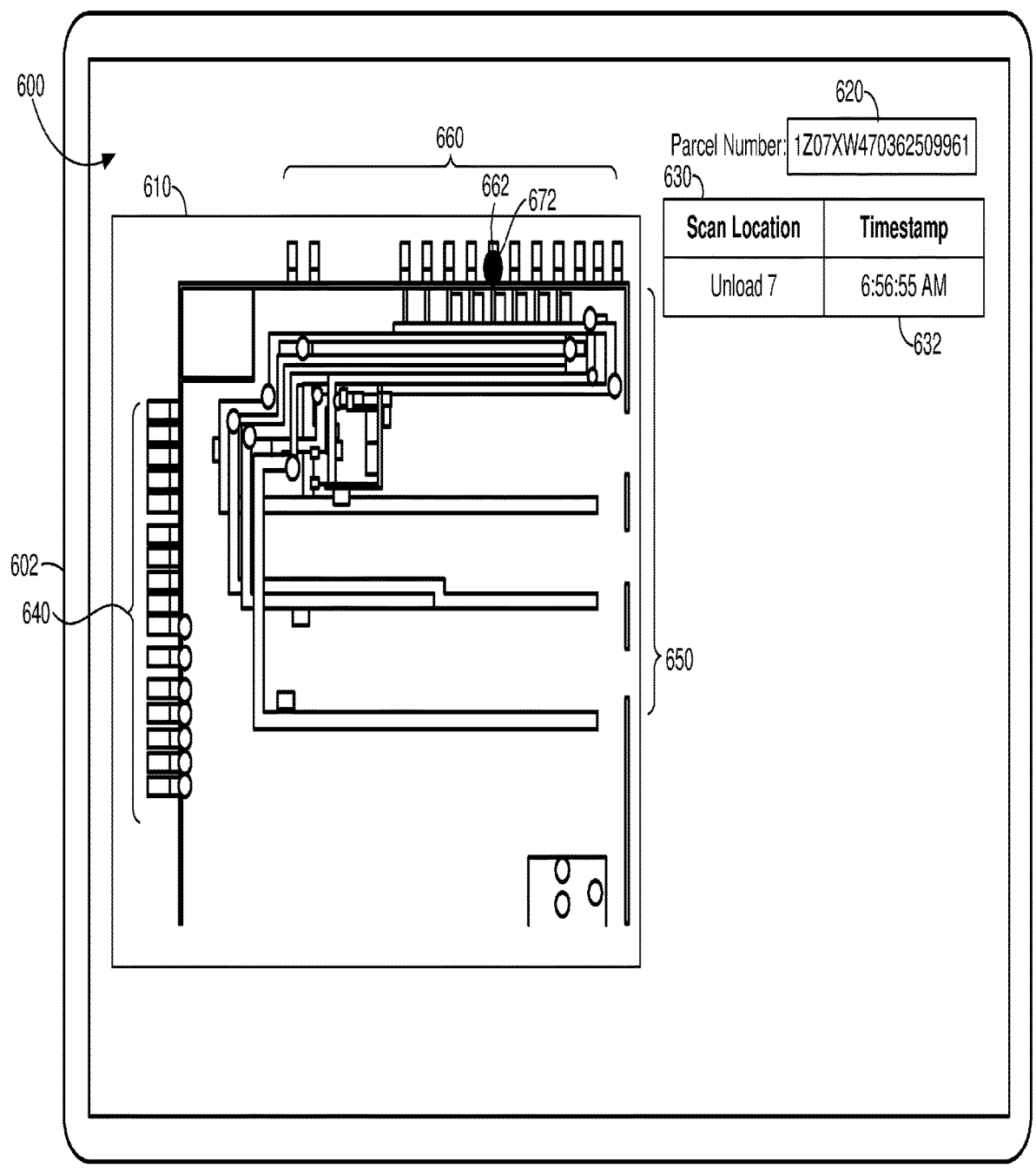
Figure 6B:
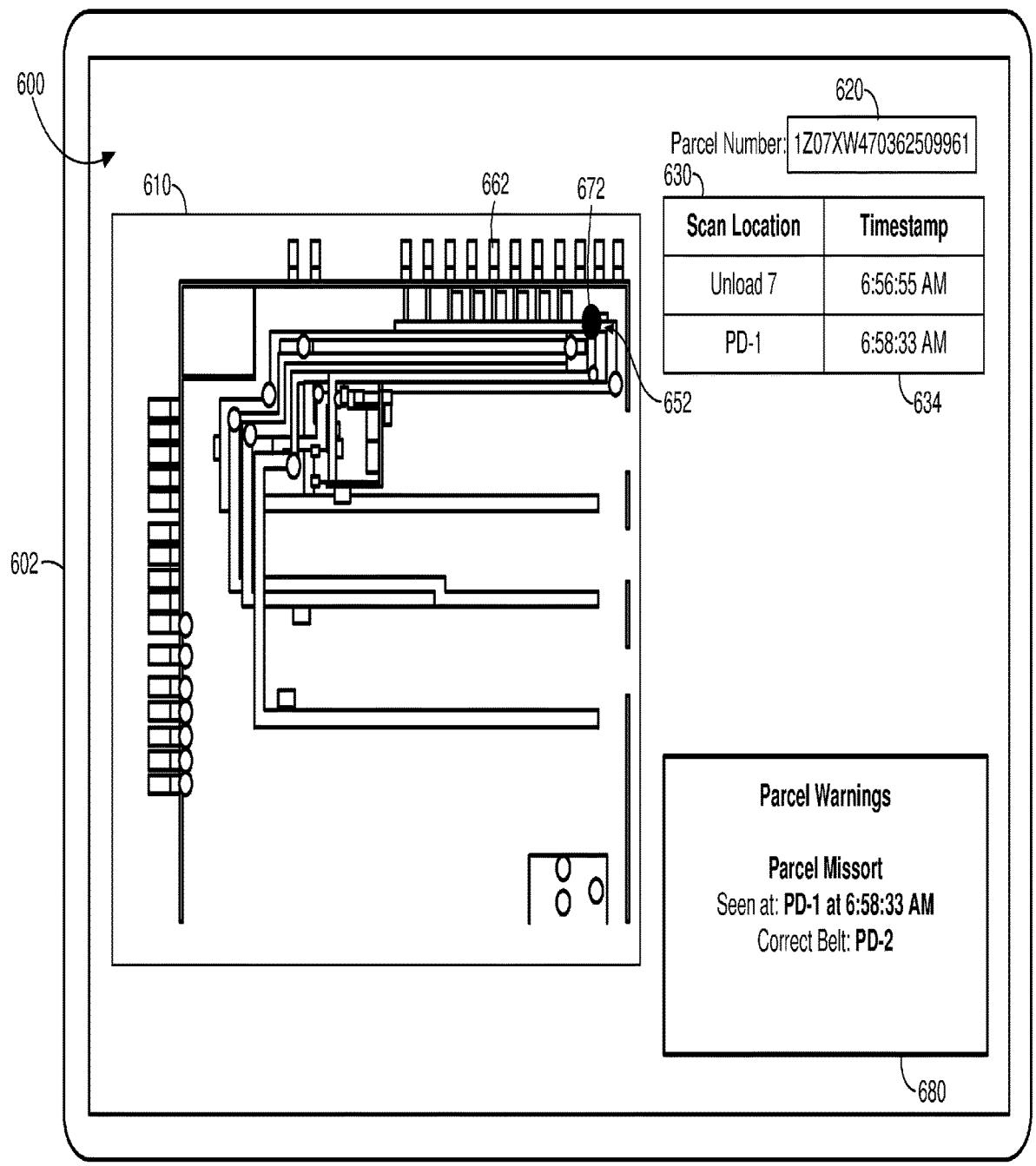

In FIG. 6A, parcel map 610 includes a location identifier 672 indicating a parcel's was last located at unload station 662. Location table 630 may also include row 632 with text identifying the workspace location corresponding to location identifier 672 and the time stamp of the read event corresponding to location identifier 672. In FIG. 6B, location identifier 672 is moved from unload station 662 to workspace location 652, which may be referred to as PD-1, and a new row 634 is added to location table 630 to add the new location and time stamp corresponding to workspace location 652. In FIG. 6B, graphical user interface 600 further includes a warning status 680 identifying an error with the parcel location. Warning status 680 may be generated or, in some instances, updated in response to a determination of this error by an embodiment of path error detector 232 of FIG. 2. Here, warning status 680 indicates that there is a parcel missort, that the parcel was seen at PD-1, and that the correct workspace location is PD-2.

Figure 6C:
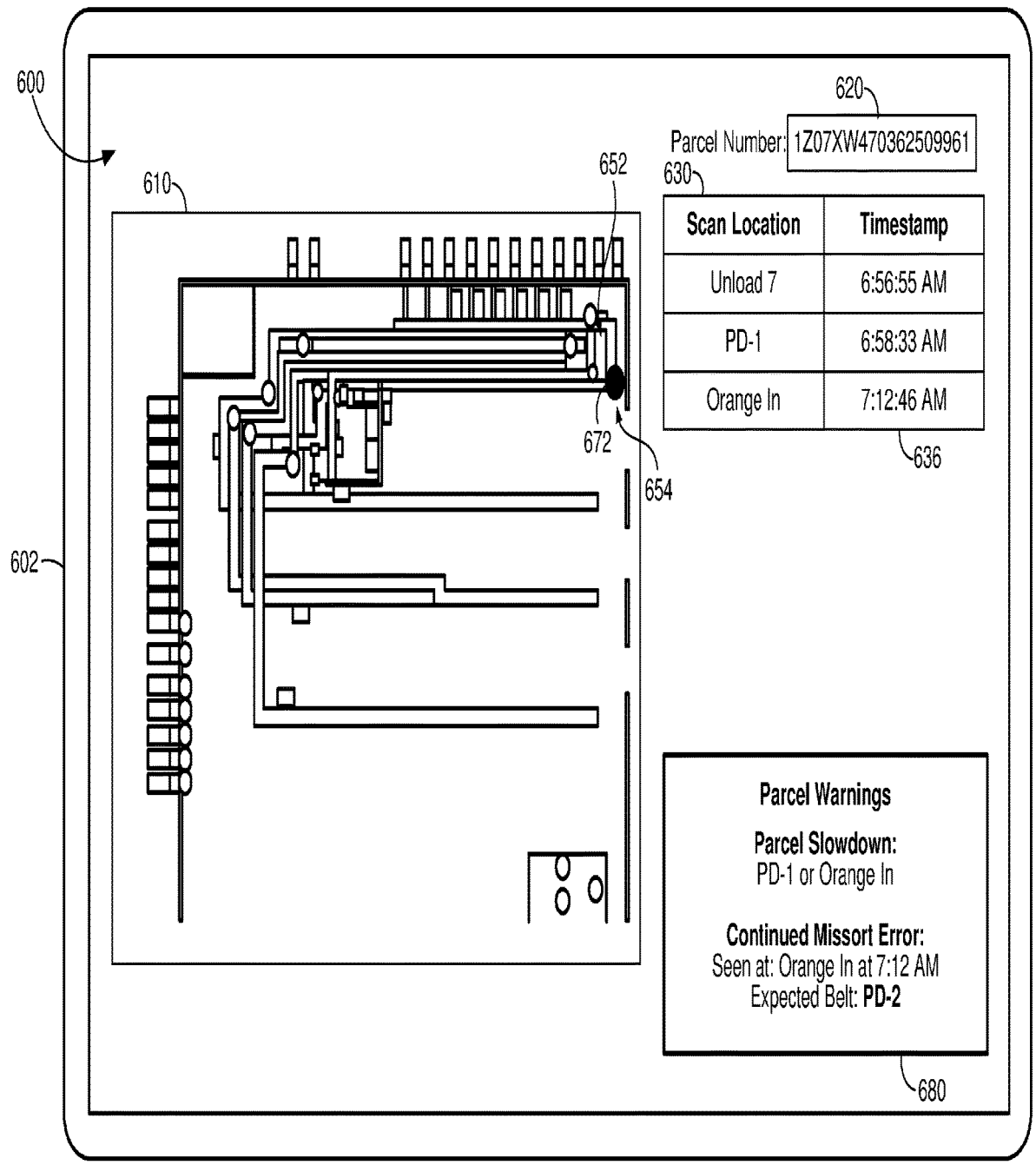

In FIG. 6C, location identifier 672 is moved from workspace location 652 to workspace location 654, which may be referred to as Orange In, and a new row 636 is added to location table 630 to add the new workspace location and time stamp corresponding to workspace location 654. In FIG. 6C, GUI 600 still includes warning status 680 that is updated to indicate the previous parcel missort is continued but now identifies the more recent workspace location. Warning status 680 is also updated to add a parcel slowdown warning. The parcel slowdown may be determined based on the times between successive reads for a parcel as described in conjunction with slowdown detector 234 in FIG. 2.

Figure 6D:
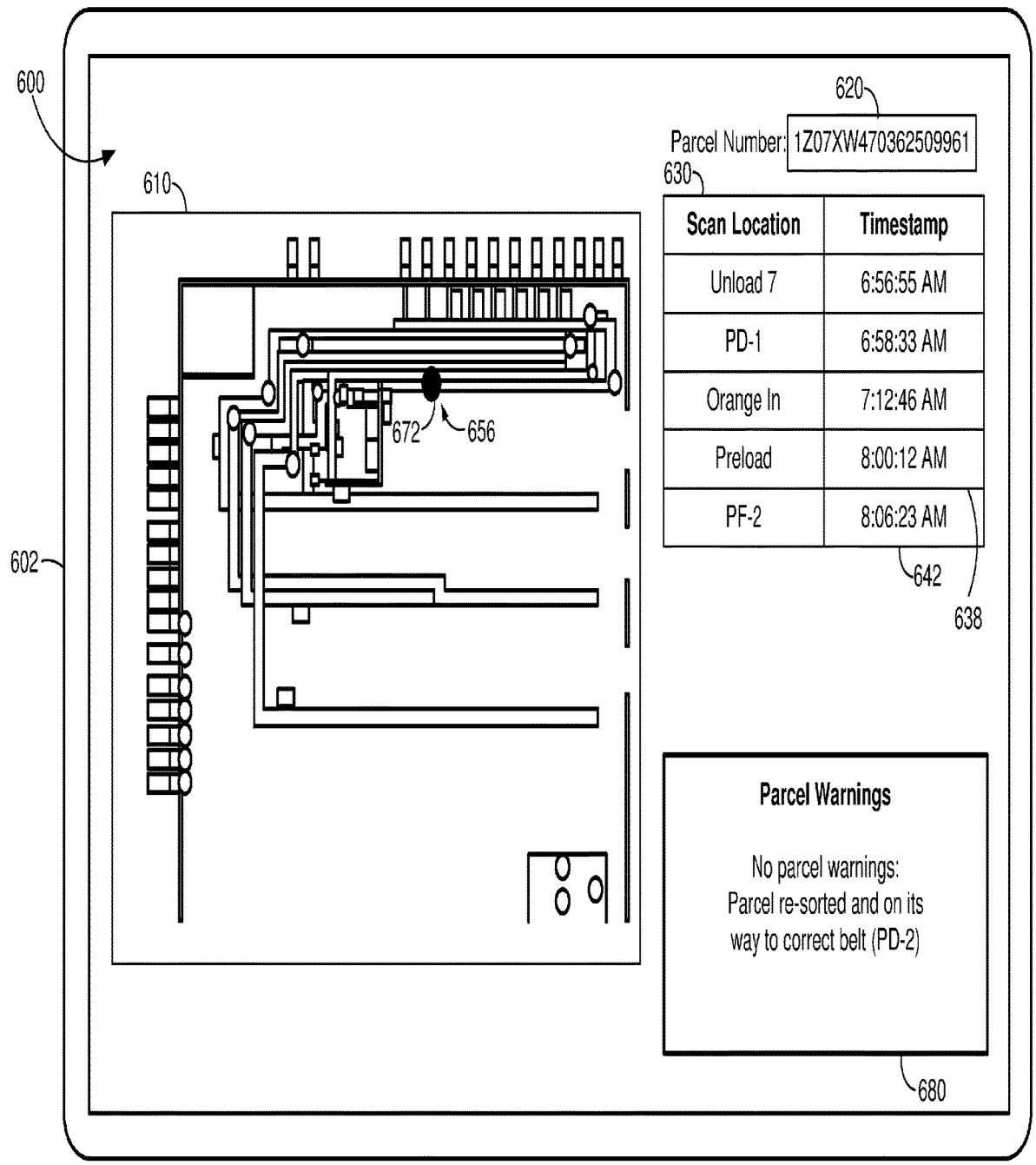

In FIG. 6D, location identifier 672 is now positioned at workspace location 656, which may be referred to as PF-2, and new rows 638 and 642 have been added to location table 630 to include two new locations and corresponding timestamps. As indicated in table 630, the parcel moved from Orange In to Preload and then to PF-2, and parcel map 610 indicates that the last detected location of parcel is workspace location 656 corresponding to PF-2. Although not depicted separately, it is understood that GUI 600 may have been updated with row 638 and a corresponding position of location indicator 672 on parcel map 610 prior to the update shown in FIG. 6D. In FIG. 6D, GUI 600 still includes warning status 680, which is updated to indicate that previous missort has been fixed as the parcel is in the correct location now and that there are no warnings.

Figure 6E:
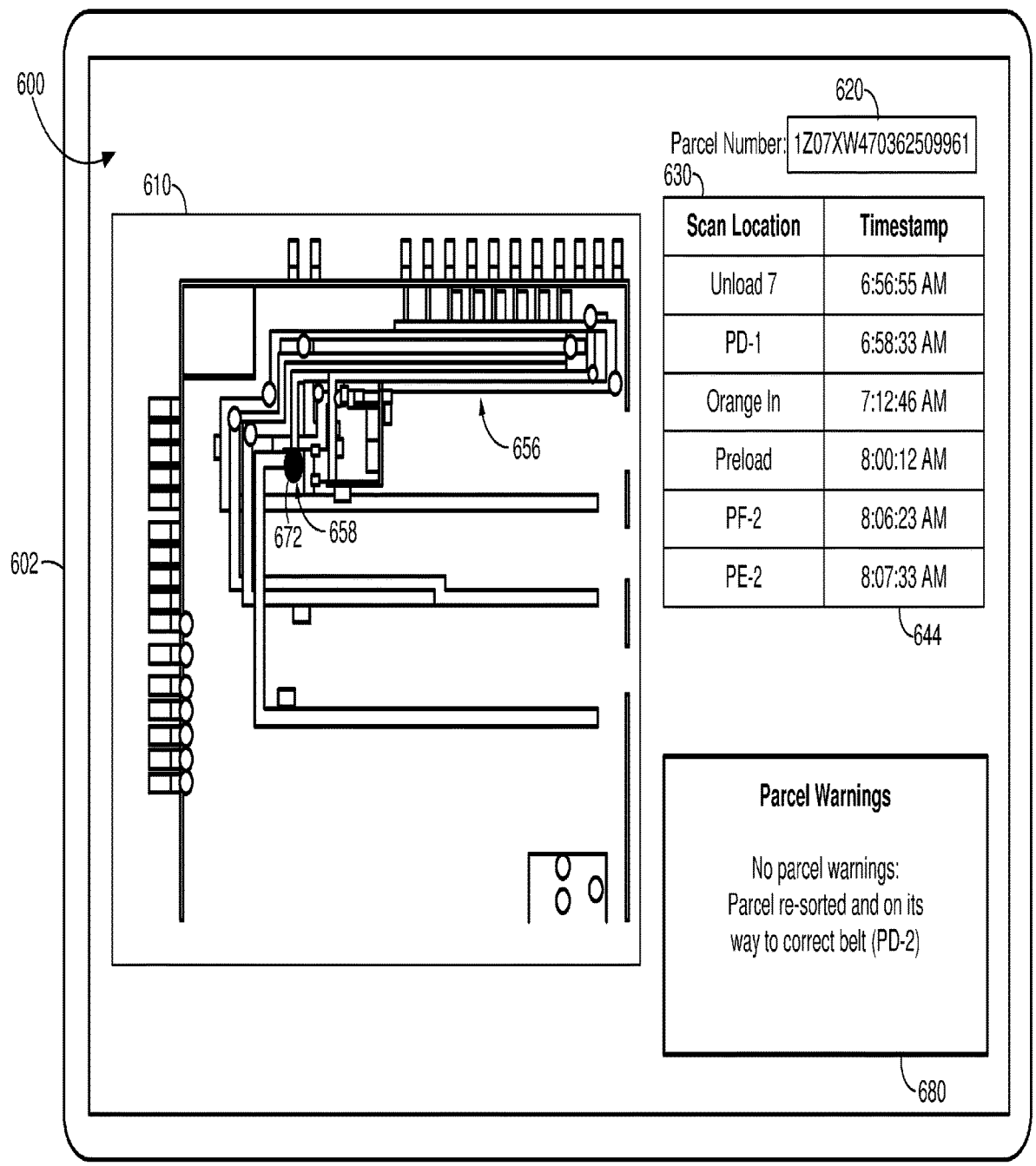
Figure 6F:
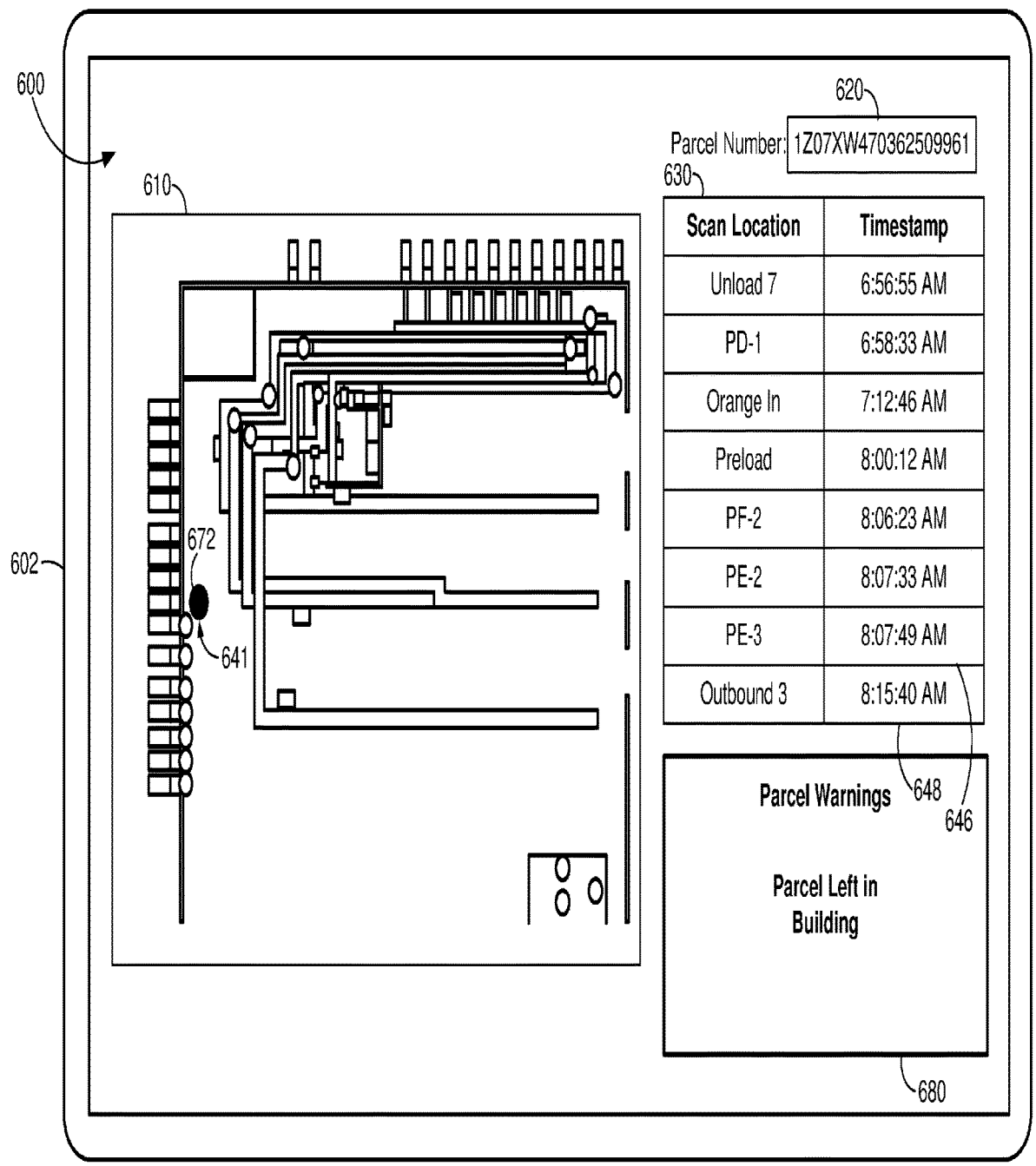

In FIG. 6E, location identifier 672 is moved from workspace location 656 to workspace location 658, which may be referred to as PE-2, and a new row 644 is added to location table 630 to add the new location and time stamp corresponding to workspace location 658. In FIG. 6E, warning status 680 still indicates that the previous missort has been fixed. In FIG. 6F, location identifier 672 is positioned at workspace location 641, which may be referred to as Outbound 3, and new rows 646 and 648 have been added to location table 630 to include two new locations and corresponding timestamps. As indicated in table 630, the parcel moved PE-2, to PE-3, to Outbound 3, and parcel map 610 indicates that the last detected location of parcel is workspace location 641 corresponding to Outbound 3. Although not depicted separately, it is understood that GUI 600 may have been updated with row 646 and a corresponding position of location indicator 672 on parcel map 610 prior to the update shown in FIG. 6F. In FIG. 6F, warning status 680 states that the parcel was left in the building. This determination may be made based on the time between successive read events for the parcel by a reader at workspace Outbound 3 exceeding a threshold time.

As illustrated in FIGS. 6A-6F, visual representations of a parcel's location may be provided to a user in real time as the parcel is moved through a facility. Additionally, errors and resolutions to errors may be presented to the user in real time. In FIGS. 6A-6F, the location indicator 672 moves to new positions within parcel map 610 as new locations of the parcel are determined from more recent parcel tracking data. It is contemplated that parcel map 610 may include indicators of previously determined locations as new locations are determined similar to GUI 500 of FIG. 5.

FIGS. 7 and 8 depict example embodiments of graphical user interfaces with elements indicating volumes of parcels. The graphical user interfaces (GUIs) 700 and 800 of FIGS. 7 and 8, respectively, may each be generated by an embodiment of presentation component 240. Additionally, parcel volumes utilized to generate GUIs 700 and 800 may be determined utilizing embodiments of volume determiner 238 of system 200. Further, GUIs 700 and 800 may each be displayed on a user device, such as user device 702 and 802, respectively, each of which may be an embodiment of user device 102 in FIG. 1. GUIs 700 and 800 may be provided on user device 702 and 802 respectively as part of a parcel tracking application running on the respective user devices or on a remote server accessed by such devices.

Turning to FIG. 7, GUI 700 is depicted comprising a graph 710 that represents volumes of parcels across various paths and subpaths for a period of time. The y-axis of graph 710 identifies workspace locations within a facility that a parcel may be coming from, and the x-axis of graph 710 identifies workspace locations within a facility that a parcel may be going to. For each pair of workspace locations, graph 710 indicates a volume of parcels that took that path between the two locations. The indication may be text written in a cell within the grid created by graph 710 as shown in FIG. 7. Additionally or alternatively, the indication may be a color such that different colors or shades indicate different volumes. In some embodiments, the parcel counts for each path are assigned a color or shade according to a gradient, which may be represented as a gradient legend tool 720 in GUI 700. In FIG. 7, for example, both text and varying shades are used to indicate the volume of parcels. For example, cell 730 within graph 710 represents a path from "DAIN" location to "SMALLSSORT2" location, and cell 730 includes the number "3" and is a dark shade of gray. Cell 740, on the other hand, represents the path from "Unload 9" location to "Preload" location, includes the number "711" and is a lighter shade of gray, indicating that the path from "Unload 9" to "Preload" has a higher volume of parcels within the relevant time period compared to the path from "DAIN" to "SMALLSORT2". Shades of gray are utilized for purposes of FIG. 7, but it will be appreciated that GUI 700 may utilized different colors to indicate different levels of parcel volume.

Parcel volumes utilized in generating GUI 700 may be determined from parcel tracking data by an embodiment of volume determiner 238 described in conjunction with FIG.

2. As indicated, the volume of parcels depicted through UI elements of GUI 700 may be determined for a particular period of time. In the example in FIG. 7, the relevant time period is one day, and GUI 700 includes a drop down menu 750 for selecting a date. As such, a user may select other dates to be presented with similar graphs representing volumes for the other dates.

While graphical user interface 700 in FIG. 7 depicts parcel volumes for different paths and subpaths, FIG. 8 illustrates a GUI 800 that depicts parcel volume over time. GUI 800 includes a line graph 805 with date represented by the x-axis and parcel count represented by the y-axis. As illustrated in FIG. 8, the parcel counts may be separated according to type of sensor. For example, line 810 represents the parcel count from antennas; line 820 represents the parcel count from sensors on small sort devices; and line 830 represents the parcel count from wearable sensors. The relevant volume represented by GUI 800 may be for an entire sorting facility or an area within the facility. As such, GUI 800 may be generated to provide a visual representation of productivity within a facility or area within a facility over time. Parcel volumes utilized in generating GUI 800 may be determined for each date from parcel tracking data by an embodiment of volume determiner 238 described in conjunction with FIG. 2. While GUI 800 illustrates how parcel volume may vary across different days of the week, the visual representation of parcel volume over time in GUI 800 may help identify unusual or unexpected changes in parcel volume.

FIGS. 9A and 9B each depict an example GUIs that indicate employee performance within a sorting facility. The GUIs 900 and 950 of FIGS. 9A and 9B, respectively, may each be generated by an embodiment of presentation component 240. Additionally, employee parcel and error counts utilized to generate the GUIs 900 and 950 may be determined in accordance with embodiments of one or more subcomponents of operations tracker 230, such as path error detector 232 and employee attributor 236. Further, GUIs 900 and 950 may each be displayed on a user device 902, which may be an embodiment of user device 102 in FIG. 1. GUIs 900 and 950 may be provided on user device 902 as part of a parcel tracking application running on user device 902 or on a remote server accessed by user device 902.

FIG. 9A illustrates an example GUI 900 that includes graph 910 indicating productivity and accuracy across multiple employees. As such, graph 910 includes an x-axis representing employees (using employee identifiers such as employee ID numbers for example), and a y-axis representing parcel counts. For each employee identifier on the x-axis, graph 910 includes a productivity indicator and an accuracy indicator for a particular time period. In example GUI 900, the relevant time period is a one day, and GUI 900 may include a specific period selector, such as drop down menu 916, for a user to select the specific date for the one-day period. As such, a user may view productivity and accuracy for other dates.

The indicators in graph 910 are in the form of bars such that each employee ID has a productivity bar 912 and an accuracy bar 914. Productivity bars 912 each represent a count of parcels that the given employee sorted during the selected time period. As explained above with respect to employee attributor 236, each read event may provide information identifying the reader participating in the read event and the date and time of the read event, and an employee assigned to the identified reader at the time of the date and time of the read event may be determined. In this way, each read event may be attributed to a particular employee. The parcel count indicated by the productivity bar 912 may be determined by aggregating all read events attributed to an employee within the relevant time period and, in some embodiments, removing a read event that is a duplicate parcel ID such that the parcel count only includes read events for unique parcels.

Accuracy bars 914 each represent a count of parcels that the given employee missorted during the selected time period. As explained above with respect to employee attributor 236, for each read event from which an error is detected, the error may be attributed to the employee assigned to the relevant reader during the time and date of the detected error. The parcel count indicated by the accuracy bar 914 may be determined by aggregating all errors resulting from read events attributed to an employee within the relevant time period. In some embodiments, aggregating the errors includes removing a read event that is a duplicate parcel ID such that the parcel count for an accuracy bar 914 only includes unique errors.

FIG. 9A shows productivity bars 912 and accuracy bars 914 for the same employees overlaying one another on graph 910. For example, an accuracy bar 914 may overlay an productivity bar 912 to provide a visual indication of an approximate percentage of parcels resulting in errors out of the total parcels for each employee. It other embodiments, productivity bars 912 and accuracy bars 914 for the same employees are presented in a stacked arrangement or in a side-by-side arrangement.

As depicted in FIG. 9A, example GUI 900 may also include a hover box 918 with information about a particular employee when a cursor is placed over a portion of graph 910 representing that employee, such as the employee ID number, a productivity bar 912, or an accuracy bar 914. Embodiments of hover box 918 may include an employee identifier, such as an employee ID number, one or more accuracy indicators, and relevant notes or messages. For instance, hover box 918 in graphical user interface 900 includes an employee ID number, a numerical average accuracy, and a message. The average accuracy may be computed from accuracy measurements determined for each day over a period of time, such as the period of the employee's employment, the period of the employee's assignment in the current sorting position, or a period of time unrelated to the specific employee, such as three months. The message in example hover box 918 displays a probability of misload by the employee. In some embodiments, this type of message of probability of misload is provided only when the probability satisfies a threshold probability, such as 30%. In other embodiments, this type of message is provided for all employees regardless of accuracy.

FIG. 9B illustrates an example GUI 950 that includes graph 960 that indicates productivity and accuracy for an employee across a period of time. As such, graph 960 includes an x-axis representing time and a y-axis representing parcel count. Graph 960 includes a productivity indicator over time and an accuracy indicator over time. The embodiment of graph 960 depicted in FIG. 9B includes productivity line 962 and accuracy line 964. Productivity line 962 indicates a total parcel count at various time points represented by graph 910 for a particular employee, and accuracy line 964 indicates a parcel count with errors, such as misloads, attributed to the employee at various time points represented by graph 910. The total parcel count and the parcel count with errors for an employee may be determined as described with respect to FIG. 9A. Productivity line 962 and accuracy line 964 may be displayed simultaneously to provide an indication of an approximate accuracy percentage by providing a visual comparison of productivity and accuracy.

In the example graph 960, the relevant time period is at least part of a day divided into 30 minute segments, starting at 8 a.m. In exemplary embodiments, GUI 950 is updated in real time or near real time as more parcel tracking data is acquired from readers. As such, GUI 950 may provide a current snap shot of productivity and accuracy while the employee is still working.

In some embodiments, GUI 950 depicted in FIG. 9B is provided in response to selection of an employee within GUI 900 depicted in FIG. 9A. For example, where a user selected a particular employee identifier with overall productivity and accuracy indicators for a day in GUI 900, GUI 950 may be presented to display a more granular breakdown of the selected employee's productivity and accuracy within the day. As such, GUIs 900 and 950 may be provided sequentially or, alternatively, may be provided in combination with each other such that both graphs 910 and 960 are displayed concurrently.

FIG. 10 depicts an example graphical user interface in the form of a dashboard 1000 indicating various aspects of tracking parcels and operations through a sorting facility. Dashboard 1000 may be generated by an embodiment of presentation component 240 of FIG. 2. Additionally, dashboard 1000 may be created using output of one or more other components of system 200, such as path generator 220 and operations tracker 230. Further, dashboard 1000 may be displayed on a user device 1002, which may be an embodiment of user device 102 in FIG. 1. Dashboard 1000 may be provided on user device 1002 as part of a parcel tracking application running on user device 1002 or on a remote server accessed by user device 1002.

Dashboard 1000 may provide visual representations of the flow of parcels through a facility and specific workspace locations in the facility in real time or near real-time. Dashboard 1000 includes one or more descriptors relating to the facility and the time. For instance, dashboard 1000 includes a date descriptor 1004 and a time descriptor 1006 to identify the current date and time, respectively. Dashboard 1000 further includes a current flow descriptor 1008 with text identifying the current flow of parcels through the facility, which is 63,980 parcels (or pieces) per hour (PPH). In the example dashboard 1000, flow is provided as PPH, but it is contemplated that other metrics, such as a parcels per minute or parcel count, may similarly be utilized in dashboard 1000. Dashboard 1000 may further include a diagrammatic representation of the facility-wide parcel flow over time. For instance, dashboard 1000 includes graphical representation 1010 comprising a line graph 1012 measuring the parcel per hour values for the facility over time. Line graph 1012 is shown as extending until a time of approximately 4:11 a.m., matching the current time identified by time descriptor 1006. At this time, line graph 1012 indicates a flow of 63,980 PPH, matching the current facility-wide flow identified by current flow descriptor 1008.

Dashboard 1000 further includes a plurality of UI elements representing expected or actual volumes or flow of parcels through one or more specific portions of the facility. For example, dashboard 1000 includes an expected parcel display area 1020 that generally indicates parcels expected to be received by the facility, workspace flow display area 1030 that generally shows the flow or volume of parcels in particular areas within the facility, and a destination tracker display area 1040 generally shows volumes of parcels being loaded for the next destination out of the facility.

Expected parcel display area 1020 indicates a volume of parcels expected to be received at the facility, which may be determined from parcel manifests received by the facility. The parcels expected to be received at the facility may be loaded on trailers expected at the facility. Expected parcel display area 1020 includes a matrix of boxes, such as box 1022, that each have an identifier indicating a particular service type. The identifiers may be colors or patterns such that boxes with different colors or patterns indicate parcels corresponding to different parcel service types. For instance, box 1022 may have an identifier indicating small sort parcels whereas box 1024 has a different identifier for a different parcel service type. Because expected parcel display area 1020 may represent a large volume of parcels, each box within expected parcel display area 1020 may represent a plurality of parcels to allow more parcels to be represented simultaneously in expected parcel display area 1020 and presented to a user. For instance, each box within expected parcel display area 1020 may represent up to 50 parcels.

As previously stated, workspace flow display area 1030 indicates flows of parcels through each workspace location. The workspace locations may be grouped together by workspace type. For instance, Primary Out flow display area 1031 indicates a flow of parcels for a larger workspace location referred to as Primary Out, as well as a breakdown of specific parcel flows for workspace locations 1033 that form Primary Out. Primary Out flow display area 1031 includes a textual descriptor 1037 for the flow of parcels through Primary Out and a bar indicator 1034 that visually represents the of flow of parcels through Primary Out relative to other workspace locations. Additionally, each smaller workspace location (e.g., 1033), which may each correspond to a reader, includes a textual descriptor (e.g., 1036) and a bar indicator (e.g., 1035). Parcels counted for the flows through workspaces in workspace flow display area 1030 may previously have been accounted for in expected parcel display area 1020.

Destination tracker display area 1040 indicates volumes of parcels that are loaded for their next destination within the route. Destination tracker flow display area 1040 indicates next destinations (e.g., 40D, 44H), which are grouped together based on a workspace location (e.g. belt 100) that serves that destination. For instance, destinations 1042 are grouped together because parcels are loaded onto a belt 100 to reach the destination. The next destinations may be a trailer/package car designated to take the parcels to a particular geographical area or may be another pieces of equipment that receives the parcel for the next stage in the logistics network.

Each destination may be represented in destination tracker display area 1040 by a name descriptor identifying the destination, a matrix of boxes representing an expected and received volume, and a percentage descriptor indicating an volumes of parcels loaded for the next destination compared to the expected volume for that destination. For instance, destination display 1041 includes a name descriptor 1043 indicating that it represents destination 33D. Destination display 1041 also includes a matrix of boxes 1044 indicating an expected volume of parcels for destination 33D. Matrix of boxes 1044 includes one box that is filled or otherwise colored to indicate the actual count of parcels that have been loaded for destination 33D. Further, destination display 1041 includes percentage descriptor 1045 indicating that approximately 2% of the expected parcels for destination 33D have been loaded. In some embodiments, expected volumes may be determined from parcel manifests and/or from destination information identified at initial scans of parcels being loaded in the facility. The actual parcels that have been loaded may be determined by read events from sensors associated with the workspace locations (e.g., trailers/cars) for the particular destination.

Destination tracker display area 1040 may further include one or more indicators of an error in a particular destination. For example, box 1046 around a display area for destination "40D" indicates that there is an error, such as a misload, associated with the workspace. Alternatively or additionally, the error may be represented by the destination display area being shaded a color, such as red, and/or may be flashing. The error indicator, such as box 1046, may be present in destination tracker area 1040 until the error is resolved. In some embodiments, destinations may be associated with a workspace (e.g., a workspace where a read event occurs prior to being loaded for the next destination), and as such, the error indicator may indicate an error that occurs with the workspace location associated with the destination. In other embodiments, an error indicator may be present for a given destination if any parcel sorted to that destination has an unresolved error. Errors may be determined by an embodiment of path error detector 232 in FIG. 2.

As mentioned, exemplary embodiments of dashboard 1000 provides flow and volume information in real time or near real time. As such, the information provided in dashboard 1000 may be regularly, periodically, or continuously updated. In one embodiment, for instance, dashboard 1000 may be updated every minute with new data received from readers, such as reader 108 described in connection with FIG. 1. In this way, dashboard user interface 1000 enables a user to receive up to date information about the facility, quickly identify errors, and manage current or future operations as deemed appropriate based on the current or trends in parcel flow.

FIGS. 11-13 each depict flow diagrams of example methods performed in accordance with embodiments of this disclosure. Each block or step of the disclosed methods comprises a computing process that may be performed using any combination of hardware, firmware, and/or software. For instance, various functions may be carried out by a processor executing instructions stored in a memory. The methods may also be embodied as computer-usable instructions stored on computer storage media. The methods may be provided by a stand-alone application, a service or a hosted service (stand-alone or in combination with another hosted service), or a plug-in to another product, to name a few. Accordingly, the methods of FIGS. 11-13 described below may be performed by one or more computing devices, such as a smartphone or other user device, a server, or a distributed computing platform, such as in the cloud environment. These methods may be performed by one or more components of system 200 of FIG. 2.

FIG. 11 depicts a flow diagram illustrating an example method 1100 for generating a graphical user interface for tracking operations within a facility utilizing read events captured as parcels are transported through the facility. At step 1102, a configuration file for the facility is accessed. The configuration file may assign readers within the facility to particular workspace locations with the facility. For example, each reader within the facility, which may include static readers and/or wearable readers, may be mapped to a workspace location forming part or an entire physical structure or area within the facility. The configuration file may be accessed at step 1102 by embodiments of path generator 220 and/or operations tracker 230 of FIG. 2. Additionally, the configuration file may be created and maintained by an embodiment of mapping component 210 of FIG. 2.

At step 1104, parcel tracking data is received. The parcel tracking data includes read events for parcels being transported through the facility. Each read event indicates a reader that captured the read event and a time the read event occurred. Read events may also identify the parcel such as by a parcel identification number, for example. Parcel tracking data may be received by embodiments of path generator 220 and/or operations tracker 230 of FIG. 2 and may be received directly from readers or from a data store, such as storage 250 of FIG. 2. In exemplary aspects, parcel tracking data is received in real time either continuously or periodically, such as every minute.

At step 1106, one or more locations for each parcel being tracked is determined utilizing the configuration file and the parcel tracking data. Each determined location is a workspace location at which that the parcel has been located during transportation of the parcel through the facility. Locations for each parcel may be determined by an embodiment of path generator 220 as described in greater detail with respect to FIG. 2. For each parcel, a path comprising a sequence of locations at which a parcel was detected may be determined. In some aspects, the path includes at least three locations, including a start node for parcel transportation, an end node for parcel transportation, and at least one workspace location between the start node and the end node. In exemplary aspects, the path is determined as the most likely path by identifying valid connections between subpaths (paths between two detected locations) within read events for a particular parcel. The configuration file may indicate valid connections between different combinations of readers. In one embodiment, an edit distance algorithm is applied to detect the most likely path from the read events, and the algorithm may be weighted in favor of subpaths that are more frequently occurring within historical parcel tracking data for that facility.

At step 1108, a graphical user interface is generated and caused to be presented on a user device. Step 1108 may be performed by an embodiment of operations tracker 230 and, in some embodiments, in conjunction with presentation component 240. The graphical user interface is generated based on the one or more locations determined for at least one parcel. GUIs 500, 600 700, 800, 900, 950, and 1000 are example graphical user interface elements that may be generated and presented in accordance with step 1108. Further, the graphical user interface generated at step 1108 may be the same or similar to the graphical user interface generated in accordance with methods 1200 and 1300 described below.

In one embodiment, the graphical user interface comprises a visual representation of each workspace location within the facility, such as a map, and indicates the one or more locations determined for at least one parcel. The map may indicate a current location, as shown in example GUI 600, or may indicate all of the determined locations for a parcel, such as shown in example GUI 500. As new parcel tracking data is received, the graphical user interface may be updated with new or different determined locations for one or more parcels.

In one embodiment, the graphical user interface represents volumes of parcels based on determined locations. For example, method 1100 may include determining a volume of parcels that have been at each workspace location based on the one or more determined locations for each parcel, and the graphical user interface may include a visual representation of parcel volume(s) for a particular time period. The graphical user interface may indicate a total parcel count for each workspace location or may show changes in parcel counts over time. Example graphic user interfaces may be embodiments of GUI 700, 800, and 1000. As new parcel tracking data is received, the graphical user interface may be updated with new parcel counts.

In one embodiment, the graphical user interface indicates an error in the path a parcel has taken through a facility. For example, an error representing an inconsistency between an expected path and the path being taken may be determined and utilized for generating the graphical user interface. As such, method 1100 may include determining sorting instructions that indicates an expected path for a parcel and comparing the expected path with the locations determined from the read events to determine if the determined locations are inconsistent with the expected path. If so, there have been a sorting error or a loading error causing the parcel to take an unexpected path through the facility, and the graphical user interface may be created to indicate that error.

In some embodiments, the error detected and indicated through the graphical user interface is a slowdown. The configuration file may indicate a threshold time period for traversing a subpath between two locations. The threshold time period may be determined based on historical parcel tracking data. Method 1100 may include determining a time it takes a parcel to move between two workspace locations forming a subpath based on the time information in read events and determining whether the determined time (e.g., exceeds or meets or exceeds) the threshold time period for that subpath. If so, the graphical user interface may indicate a transport slow down at that particular subpath.

FIG. 12 depicts a flow diagram illustrating an example method 1200 for generating a graphical user interface for tracking parcel location(s) during transportation within a facility. At step 12102, a configuration file for the facility is accessed and, at step 1204 is received. In exemplary embodiments, step 1202 and step 1204 are performed as described with respect to step 1102 and step 1104, respectively, of method 1100.

At step 1206, one or more locations at least one parcel being tracked is determined utilizing the configuration file and the parcel tracking data. Each determined location is a workspace location at which that the parcel has been during transportation of the parcel through the facility. Locations for each parcel may be determined by an embodiment of path generator 220 as described in greater detail with respect to FIG. 2. Further, embodiments of step 1206 may be performed as described with respect to step 1106 of method 1100.

At step 1208, a graphical user interface is generated and caused to be presented on a user device based on the one or more locations determined for the at least one parcel. The graphical user interface is generated to include one or more interface elements representing the one or more locations determined for the at least one parcel. For example, in one embodiment, the graphical user interface comprises a visual representation of each workspace location within the facility, such as a map, and indicates the one or more locations determined for at least one parcel. As new parcel track data is received, the graphical user interface may be updated (which may be in real time) with new or different determined locations for one or more parcels. Additionally, in some embodiments, path errors representing inconsistencies between an expected path and determined locations and/or transport slow down errors may be determined and included in the graphical user interface. Example graphical user interfaces provided in accordance with some embodiments of method 1200 are depicted in FIGS. 5, 6A-6F, and 10. Step 1208 may be performed as described with some embodiments of step 1108 of method 1100 described in conjunction with FIG. 11.

FIG. 13 depicts a flow diagram illustrating an example method 1300 for generating a graphical user interface for tracking employee performance utilizing read events captured as parcels are transported through a facility. At step 1302, a configuration file mapping readers within a facility to workspace locations is accessed. At step 1304, parcel tracking data comprising read events for parcels being transported through the facility is received where each read event indicates a reader that captured the read event and a time the read event occurred. In exemplary embodiments, step 1302 and step 1304 are performed as described with respect to step 1102 and 1104 of method 1100.

At step 1306, one or more locations at least one parcel being tracked is determined utilizing the configuration file and the parcel tracking data. Each determined location is a workspace location at which that the parcel has been during transportation of the parcel through the facility. Locations for each parcel may be determined by an embodiment of path generator 220 as described in greater detail with respect to FIG. 2. Further, embodiments of step 1306 may be performed as described with respect to step 1106 of method 1100.

At step 1308, an expected path for the parcel is determined based on sorting instructions for the parcel. The sorting instructions may be determined from an initial read event, which may occur when the parcel is unloaded into the facility. At step 1310, one or more errors may be determined based on inconsistencies between the expected path for at least one parcel and the one or more locations determined based on the parcel tracking data at step 1306. Step 1308 and 1306 may be performed by an embodiment of path error detector 232 of FIG. 2. Method 1300 may further include attributing the one or more errors being attributed to an employee associated with a reader capturing scans for the at least one parcel. For example, an employee assigned to a reader, such as a wearable reader device, may be attributed an error when the read event captured by the assigned reader identifies a location that is inconsistent with the expected path. Attributing an error to an employee may be performed by an embodiment of employee attributor 238 of FIG. 2.

At step 1312, a graphical user interface is generated and caused to be presented on a user device based on the one or more errors attributed to the employee. In some embodiments, graphical user interface indicates a productivity metric indicating the productivity for the employee for a time period. As described with respect to employee attributor 238, productivity may be measured as a total parcel read event count and may be determined by aggregating read events with unique parcel identification numbers from the reader assigned to the employee. Additionally, the graphical user interface may include an accuracy metric of the employee over time based on the one or more errors attributed to the employee. As described with respect to employee attributor 238, productivity may be a measure of accurate read events relative to total read events, or productivity. For example, an accuracy metric may be a percentage of the employee's non-error read events, which may be computed as the difference between the total read events attributed to the employee and the errors attributed to the employee, out of the employee's total read events. Further, some embodiments of the graphical user interface indicate a predicted likelihood of the employee committee a future error, which may be determined by one or more machine learning models and, in some aspects, the employee's historical errors as described with respect to employee attributor 238. Example graphical user interfaces provided in accordance with some embodiments of method 1300 are depicted in FIGS. 9A and 9B. Step 1312 may be performed as described with some embodiments of step 1108 of method 1100 described in conjunction with FIG. 11.

With reference to FIG. 14, computing device 1400 includes a bus 1410 that directly or indirectly couples various devices including a memory 1412, one or more processor(s) 1414, one or more presentation component(s) 1416, one or more input/output (I/O) port(s) 1418, one or more I/O components 1420, and an illustrative power supply 1422. Some embodiments of computing device 1400 may further include one or more radios 1424. Bus 1410 represents one or more busses (such as an address bus, a data bus, or a combination thereof). Although various blocks of FIG. 14 are shown with lines for the sake of clarity, in reality, these blocks represent logical, not necessarily actual, components. For example, one may consider a presentation component such as a display device to be an I/O component. Also, a processor may have a memory. FIG. 14 is merely illustrative of an exemplary computing device that can be used in connection with one or more embodiments of the present disclosure. Distinction is not made between such categories as "workstation," "server," "laptop," or "handheld device," as all are contemplated within the scope of FIG. 14 and with reference to "computing device."

Computing device 1400 typically includes a variety of computer-readable media. Computer-readable media can be any available media that can be accessed by computing device 1400 and includes both volatile and nonvolatile, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, Random-access memory (RAM), Read-only memory (ROM), electrically erasable programmable read-only memory (EEPROM), flash memory or other memory technology, Compact Disc Read-Only Memory (CD-ROM), digital versatile disks (DVDs) or other optical disk storage, magnetic cassettes, magnetic tape, magnetic disk storage or other magnetic storage devices, or any other medium, which can be used to store the desired information and can be accessed by computing device 1400. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or a direct-wired connection, and wireless media, such as acoustic, radio frequency (RF), infrared, and other wireless media. Combinations of any of the above should also be included within the scope of computer-readable media.

Memory 1412 includes computer storage media in the form of volatile and/or nonvolatile memory. The memory may be removable, non-removable, or a combination thereof. Exemplary hardware devices include for example solid-state memory, hard drives, and optical-disc drives. Computing device 1400 includes one or more processor(s) 1414 that reads data from various devices such as memory 1412 or I/O components 1420. Presentation component(s) 1416 presents data indications to a user or other device. Exemplary presentation component(s) 1416 may include a display device, a speaker, a printing component, a vibrating component, and the like.

The I/O port(s) 1418 allow computing device 1400 to be logically coupled to other devices, including I/O components 1420, some of which may be built in. Illustrative components include a microphone, a joystick, a game pad, a satellite dish, a scanner, a printer, or a wireless device. The I/O components 1420 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition (both on screen and adjacent to the screen), air gestures, head and eye tracking, and touch recognition associated with displays on the computing device 1400. The computing device 1400 may be equipped with depth cameras, such as stereoscopic camera systems, infrared camera systems, RGB camera systems, and combinations of these, for gesture detection and recognition. Additionally, the computing device 1400 may be equipped with accelerometers or gyroscopes that enable detection of motion. The output of the accelerometers or gyroscopes may be provided to the display of the computing device 1400 to render immersive augmented reality or virtual reality.

Some embodiments of computing device 1400 may include one or more radio(s) 1424 (or similar wireless communication components). The radio(s) 1424 transmits and receives radio or wireless communications. The computing device 1400 may be a wireless terminal adapted to receive communications and media over various wireless networks. Computing device 1400 may communicate via wireless protocols, such as code division multiple access ("CDMA"), global system for mobiles ("GSM"), time division multiple access ("TDMA"), or other wireless means, to communicate with other devices. The radio communications may be a short-range connection, a long-range connection, or a combination of both. Herein, "short" and "long" types of connections do not refer to the spatial relation between two devices. Instead, these connection types are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a Wireless Local Area Network (WLAN) connection using the 802.11 protocol; a Bluetooth connection to another computing device is another example of a short-range connection; or a near-field communication. A long-range connection may include a connection using, by way of example and not limitation, one or more of CDMA, General Packet Radio Service (GPRS), GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A method comprising:
receiving tracking data comprising a plurality of read events for an object traveling through a facility, wherein each read event of the plurality of read events indicates a radio frequency identification (RFID) tag associated with the object being read by a reader of a plurality of readers;
determining, by a computer processor and based at least in part on a configuration file and the tracking data, a path for the object to travel through the facility, wherein:
the path comprises a sequence of locations derived from a plurality of locations within the facility,
the configuration file (i) assigns each reader of the plurality of readers to a location of the plurality of locations and (ii) indicates a physical path between each pair of sequential locations in the sequence of locations, and
a read event of the plurality of read events indicates the RFID tag associated with the object being read by the reader assigned to at least one location of the sequence of locations, and
causing, by the computer processor, presentation of a graphical user interface comprising at least a portion of the path on a computer device.

2. The method of claim 1, wherein the graphical user interface displays a visual representation of the facility that includes location indicators for the object that are positioned at locations from the plurality of locations that correspond to the plurality of read events found in the tracking data.

3. The method of claim 2, wherein the graphical user interface further displays a location table that comprises a descriptor for each location of the sequence of locations and a time corresponding to the read event of the plurality of read events indicating the RFID tag associated with the object being read by the reader assigned to the at least one location of the sequence of locations.

4. The method of claim 1 further comprising determining, by the computer processor and based at least in part on the path and an expected path for the object, a path error for the object, wherein the graphical user interface displays the path error.

5. The method of claim 4 further comprising attributing, by the computer processor, the path error to an individual who is assigned to a first location of the sequence of locations where the path error occurred, wherein the graphical user interface displays an identity of the individual.

6. The method of claim 1 further comprising:
identifying, by the computer processor and based at least in part on the tracking data, a duration of time that the object took to traverse between a first location and a second location in the sequence of locations for the path;
identifying, by the computer processor and based at least in part on the configuration file, a threshold time period for traversing between the first location and the second location; and
determining, by the computer processor and based at least in part on the duration of time being greater than the threshold time period, a slowdown error, wherein the graphical user interface displays the slowdown error.

7. The method of claim 1 further comprising aggregating a read event from the plurality of read events associated with a first location of the plurality of locations with other read events indicating other RFID tags associated with other objects being read by the reader of the plurality of readers at the location to generate a total object count for the location, wherein the graphical user interface displays the total object count.

8. A system comprising:
a non-transitory computer-readable medium storing instructions; and
a processing device communicatively coupled to the non-transitory computer-readable medium, wherein the processing device is configured to execute the instructions and thereby perform operations comprising:
receiving tracking data comprising a plurality of read events for an object traveling through a facility, wherein each read event of the plurality of read events indicates the object being identified by a reader of a plurality of readers;
determining, based at least in part on a configuration file and the tracking data, a path for the object to travel through the facility, wherein:
the path comprises a sequence of locations, and
the configuration file (i) assigns each reader of the plurality of readers to at least one of a location within the facility or an individual located within the facility and (ii) indicates a physical path between each pair of sequential locations in the sequence of locations, and
causing presentation of a graphical user interface comprising at least a portion of the path on a computer device.

9. The system of claim 8, wherein the graphical user interface displays a visual representation of the facility that includes location indicators for the object that are positioned at locations that correspond to the plurality of read events found in the tracking data.

10. The system of claim 9, wherein the graphical user interface further displays a location table that comprises a descriptor for each location of the sequence of locations and a time corresponding to a read event of the plurality of read events indicating the object being identified by the reader assigned to at least one of a first location of the sequence of locations or an individual associated with the location of the sequence of locations.

11. The system of claim 8, wherein the operations further comprise determining, based at least in part on the path and an expected path for the object, a path error for the object, wherein the graphical user interface displays the path error.

12. The system of claim 11, wherein the operations further comprise attributing the path error to a particular individual who is located in a particular location of the sequence of locations where the path error occurred, and the graphical user interface displays an identity of the individual.

13. The system of claim 8, wherein the operations further comprise:
identifying, based at least in part on the tracking data, a duration of time that the object took to traverse between a first location and a second location in the sequence of locations for the path;
identifying a threshold time period for traversing between the first location and the second location; and
determining, based at least in part on the duration of time satisfying the threshold time period, a slowdown error, wherein the graphical user interface displays the slowdown error.

14. The system of claim 8, wherein the operations further comprise determining, based at least in part on the tracking data, a measure of productivity for a particular individual associated with a particular reader of the plurality of readers, and the graphical user interface displays the measure of productivity.

15. A non-transitory computer-readable medium storing computer-executable instructions that, when executed by computing hardware, configure the computing hardware to perform operations comprising;
   determining, based at least in part on a configuration file and tracking data, a path for an object travelling through a facility, wherein:
      the tracking data comprises a plurality of read events for the object as the object travels through the facility,
      each read event of the plurality of read events indicates a radio frequency identification (RFID) tag associated with the object being read by a reader of a plurality of readers,
      the path comprises a sequence of locations derived from a plurality of locations within the facility, and
      the configuration file (i) assigns each reader of the plurality of readers to a location of the plurality of locations and (ii) indicates a physical path between each pair of sequential locations in the sequence of locations, and
   causing presentation of a graphical user interface comprising at least a portion of the path on a computer device.

16. The non-transitory computer-readable medium of claim 15, wherein the graphical user interface displays a visual representation of the facility that includes location indicators for the object that are positioned at locations from the plurality of locations that correspond to the plurality of read events found in the tracking data.

17. The non-transitory computer-readable medium of claim 16, wherein the graphical user interface further displays a location table that comprises a descriptor for each location of the sequence of locations and a time corresponding to a read event of the plurality of read events indicating the RFID tag associated with the object being read by the reader assigned to at least one location of the sequence of locations.

18. The non-transitory computer-readable medium of claim 15, wherein the operations further comprise determining, based at least in part on the path and an expected path for the object, a path error for the object, wherein the graphical user interface displays the path error.

19. The non-transitory computer-readable medium of claim 18, wherein the operations further comprise attributing the path error to an individual who is assigned to a first location of the sequence of locations where the path error occurred, and the graphical user interface displays an identity of the individual.

20. The non-transitory computer-readable medium of claim 18, wherein the operations further comprise:
   identifying, based at least in part on the tracking data, a duration of time that the object took to traverse between a first location and a second location in the sequence of locations for the path;
   identifying a threshold time period for traversing between the first location and the second location; and
   determining, based at least in part on the duration of time satisfying the threshold time period, a slowdown error, wherein the graphical user interface displays the slowdown error.

* * * * *